United States Patent
Duggal et al.

(10) Patent No.: US 12,045,615 B1
(45) Date of Patent: Jul. 23, 2024

(54) PROCESSING OF SYNCHRONIZATION BARRIER INSTRUCTIONS

(71) Applicant: Apple Inc., Cupertino, CA (US)

(72) Inventors: Deepankar Duggal, Sunnyvale, CA (US); Kulin N Kothari, Cupertino, CA (US); Mridul Agarwal, Saratoga, CA (US); Chang Xu, Cupertino, CA (US); Yanran Yang, Sunnyvale, CA (US); Richard F Russo, Saratoga, CA (US); Yuan C Chou, Los Gatos, CA (US); Douglas C Holman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 17/933,040

(22) Filed: Sep. 16, 2022

(51) Int. Cl.
G06F 9/30 (2018.01)
G06F 9/38 (2018.01)
G06F 9/52 (2006.01)

(52) U.S. Cl.
CPC ........ G06F 9/30087 (2013.01); G06F 9/3802 (2013.01); G06F 9/522 (2013.01)

(58) Field of Classification Search
CPC ..... G06F 9/30087; G06F 9/3802; G06F 9/522
See application file for complete search history.

(56) References Cited

U.S. PATENT DOCUMENTS

| | | | |
|---|---|---|---|
| 7,437,521 B1 | 10/2008 | Scott | |
| 8,856,447 B2 * | 10/2014 | Williams, III | ...... G06F 12/0862 711/132 |
| 9,575,815 B1 | 2/2017 | Guthrie | |
| 9,830,158 B2 | 11/2017 | Choquette et al. | |
| 11,263,043 B1 | 3/2022 | Mukherjee | |
| 11,307,857 B2 | 4/2022 | Mukherjee | |
| 2014/0281429 A1* | 9/2014 | Brown | ................ G06F 9/30087 712/226 |
| 2014/0317358 A1* | 10/2014 | Meier | ................ G06F 12/0815 711/141 |
| 2016/0139922 A1 | 5/2016 | Craske | |
| 2016/0140040 A1 | 5/2016 | Mukherjee | |
| 2016/0140047 A1 | 5/2016 | Mukherjee | |
| 2016/0140051 A1 | 5/2016 | Kessler | |
| 2017/0177422 A1 | 6/2017 | Guthrie | |
| 2017/0286116 A1* | 10/2017 | Johar | .................... G06F 9/3806 |
| 2019/0034349 A1 | 1/2019 | McAvoy | |
| 2020/0278801 A1 | 9/2020 | Parker et al. | |

(Continued)

OTHER PUBLICATIONS

U.S. Appl. No. 17/933,037, filed Sep. 16, 2022, Madhu Sudan Hari, et al.

*Primary Examiner* — Shawn Doman
(74) *Attorney, Agent, or Firm* — Robert C. Kowert; Kowert, Hood, Munyon, Rankin & Goetzel, P.C.

(57) ABSTRACT

A system, e.g., a system on a chip (SOC), may include one or more processors. A processor may execute an instruction synchronization barrier (ISB) instruction to enforce an ordering constraint on instructions. To execute the ISB instruction, the processor may determine whether contexts of the processor required for execution of instructions older than the ISB instruction are consumed for the older instructions. Responsive to determining that the contexts are consumed for the older instructions, the processor may initiate fetching of an instruction younger than the ISB instruction, without waiting for the older instructions to retire.

20 Claims, 18 Drawing Sheets

(56) References Cited

U.S. PATENT DOCUMENTS

| | | |
|---|---|---|
| 2022/0035748 A1 | 2/2022 | Campbell |
| 2022/0083338 A1 | 3/2022 | Gonion et al. |
| 2023/0281133 A1* | 9/2023 | Montero ............ G06F 9/30047 |
| | | 711/6 |

* cited by examiner

PROCESSING OF SYNCHRONIZATION BARRIER INSTRUCTIONS

BACKGROUND

Technical Field

Embodiments described herein are related to a system including one or more processors and, more particularly, to processing of synchronization barrier instructions in such a system.

Description of the Related Art

Computing systems generally include one or more processors that serve as central processing units (CPUs). The processors execute various control software (e.g., an operating system) that controls operation of computing devices and/or various peripherals. The processors can also execute applications, which provide user functionality in the system. Sometimes, a processor may include an instruction pipeline having multiple stages, where instructions are divided in to a series of steps to be individually executed at corresponding stages of the pipeline. As a result, multiple instructions may be processed in the instruction pipeline in parallel at different stages. Sometimes, a processor may use synchronization barrier instructions, such as instruction synchronization barrier (ISB) and data synchronization barrier (DSB) instructions, to enforce ordering constraints. However, the synchronization barrier instructions may stall operation of the instruction pipeline and/or cause flush of the instruction pipeline. This may result in delays and/or waste of resources of the processor, and thus reduce performance. Therefore, it is desirable for improved ways to process synchronization barrier instructions in processors.

BRIEF DESCRIPTION OF THE DRAWINGS

The following detailed description refers to the accompanying drawings, which are now briefly described.

Figure 1:
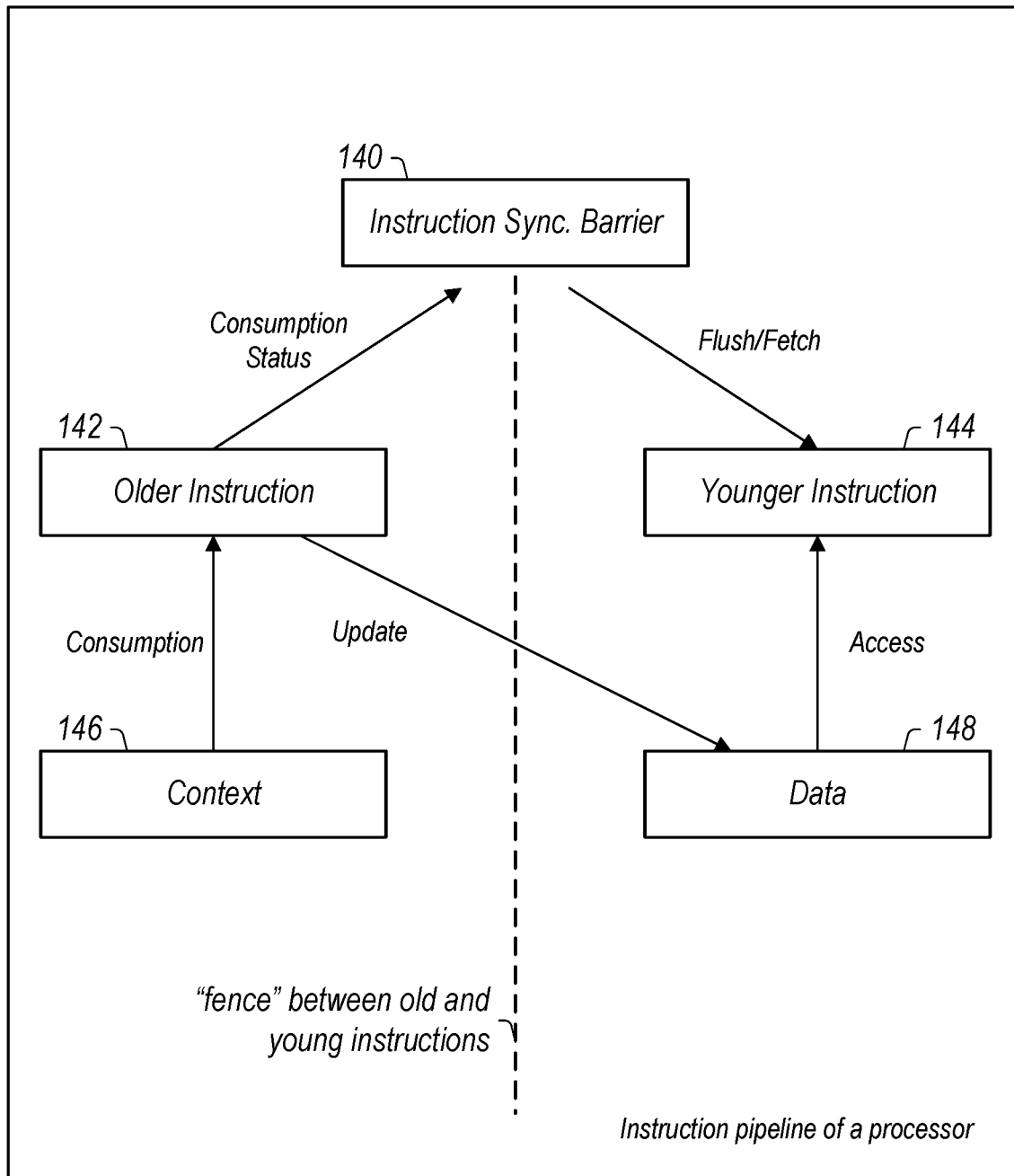
FIG. 1 is a block diagram of an embodiment for processing an instruction synchronization barrier (ISB) instruction in a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

A processor may include one or more circuits configured to implement a multi-stage instruction pipeline for processing instructions. For example, a processor may use the circuits to implement an instruction pipeline that may further include multiple stages, e.g., fetch, decode, execute, and/or commit stages. Sometimes, the instruction pipeline may execute instructions out of order, or in other words, not according to the program order of the instructions, to improve performance. For example, the processor may use a fetch and decode circuit (e.g., fetch and decode unit 100 in FIG. 15) to fetch and decode instructions according to a program order of the instructions, e.g., the order between the instructions in the corresponding software program. However, once decoded, a second instruction that comes after a first instruction in the software program (also called "older" than the first instruction) may be executed, e.g., by an execution circuit (e.g., execute unit 112 in FIG. 15), before the first instruction. This is also called speculative execution of the second instruction because it is executed "ahead of time." Sometimes, the instruction pipeline may also include a reorder buffer (ROB) (e.g., reorder buffer 108 of MDR unit 106 in FIG. 15). Executional results from instructions are first written to the ROB, and then further committed (e.g., stored or saved) from the ROB to a cache or memory, e.g., using a load/store circuit (e.g., load/sore unit 118 in FIG. 15). The ROB may include multiple entries for storing results of the instructions. The entries may be organized in the ROB according to the original program order of the instructions, and the results may be committed from the ROB to the cache or memory according to the entries' order in the ROB. For example, the result in an entry at the top of the ROB may correspond to the oldest instruction. The result in this entry may be the first to be stored to the cache or memory. Afterwards, the entry may be cleared, and the corresponding instruction may be considered completed and "retired" from the ROB. Next, the ROB may move to the next entry storing the result for the next instruction, or in other words, the next entry now "moves to" the top of the ROB. After the result of this instruction becomes available, the ROB may store the result in this entry to the cache or memory. Accordingly, the next instruction may be completed and retire from the ROB, the ROB may move to the subsequent entry, and so on. Therefore, as a result, although the instructions may be executed out of order, the ROB may ensure that their results are committed to the cache or memory still in order. Also, based on the information of ROB, the instruction pipeline may be able to determine whether or not an instruction becomes non-speculative, e.g., when the instruction becomes the oldest yet-to-be-retried instruction.

An instruction synchronization barrier (ISB) instruction is a barrier instruction used by a processor to enforce an ordering constraint on instructions. The ISB instruction may form a fence between instructions before the ISB instruction in a program order (e.g., older instructions) and instructions after the ISB instruction (e.g., younger instruction), such that if an older instruction changes or updates contexts of the processor (also called context-changing events), e.g., change or update data in registers of the processor, change or update of keys for security purposes, etc., the effects of the context-changing events may be visible to a younger instruction. For example, sometimes an ISB instruction may be used after an instruction that writes a data to a processor's register. In that case, the ISB instruction may be used to ensure that a new value of the data will be set up in the register appropriately, such that if a younger instruction accesses the data, the younger instruction will be able to access the new value. To accomplish the purpose, the ISB instruction may cause fetch of instructions younger than the ISB instruction from the cache or memory. If the younger instructions have been previously fetched in to the instruction pipeline of the processor, e.g., before execution of the ISB instruction, the ISB instruction may flush the instruction pipeline to remove the younger instructions from the instruction pipeline, so that the younger instructions may be re-fetched from the cache or memory.

Traditionally, a processor may execute the ISB instruction only when the ISB instruction becomes non-speculative, e.g., until after all instructions older than the ISB instructions have retired from the ROB. As a result, when younger instructions are fetched or re-fetched from the cache or memory, the younger instructions may be able to access changed or updated contexts caused by the older instructions. However, the non-speculative execution of the ISB instruction may cause undesirable delays to operation of the instruction pipeline. Therefore, in this disclosure, various embodiments are described to provide more efficient ways for a processor to process ISB instructions, in particular, to speculatively process ISB instructions.

As described above, one purpose of the ISB instruction is to ensure that effects of context-changing events caused by older instructions are visible to younger instructions. However, from the perspective of the older instructions, the old instructions may not necessarily require the processor to wait to fetch the younger instructions until the older instructions retire. Instead, what matters to the older instructions may be that contexts required for execution of the older instructions have been consumed by the processor for executing the older instructions before the younger instructions are fetched. For example, if execution of an older instruction requires a data, what matters to the older instruction may be that the existing or "old" value of the data is read or accessed by the older instruction. In other words, even though the younger instructions may change or update contexts of the processor, the younger instructions may still be allowed to be fetched in to the instruction pipeline, as long as the older instructions dependent on the old and correct values of the contexts have accessed or used the old values before the updates by the younger instructions occur, regardless of whether or not the older instructions have fully retired or their results have been actually committed. Therefore, once contexts required by all the older instructions have been consumed for execution of the older instructions, the processor may execute the ISB instruction to cause younger instructions to be fetched. Because the processor may process the ISB instruction, without having to wait for the older instructions to fully retire from the ROB and the ISB instruction to become non-speculative, this may be considered as speculative processing of the ISB instruction. In contrast to traditional non-speculative processing, the speculative processing of the ISB instruction may accelerate operation of the processor and thus improve the processor's performance.

Turning now to FIG. 1, a block diagram of an embodiment for processing an instruction synchronization barrier (ISB) instruction in a processor is shown. The processor (e.g., processor 30 described below) may include an instruction pipeline implemented by one or more circuits to process instructions, including ISB instructions. As indicated in FIG. 1, an ISB instruction 140 may form a fence between an older instruction 142 and a younger instruction 144, illustrated in FIG. 1. The older instruction 142 may be before the ISB instruction 140 in a program order, whereas the younger instruction 144 may be after the ISB instruction 140 in the program order. Note that for purposes of illustration, only one older instruction 142 and one younger instruction 144 are illustrated in this example. However, the embodiment disclosed herein may apply to scenarios where there are multiple older instructions and/or multiple younger instructions, before and after the ISB instruction respectively.

In the illustrated embodiment, the processor may include an instruction pipeline to execute instruction including the ISB instruction 140. To execute the ISB instruction 140, the instruction pipeline of the processor may determine whether a context 146 that is required by the older instruction 142 is consumed by the processor for executing the older 142. For example, if the context 146 is data in a register of the processor, the instruction pipeline may determine whether the older instruction 142 has read or accessed the value of the data in the register. Note that this is only an example for purposes of illustration. Contexts of the processor may include various content and/or data representing and/or associated with states of the processor, such as data in registers, address space, stack space, virtual address space, program counter of the processor, etc., and therefore the consumption of the contexts may include various types of operation. Referring back to FIG. 1, when the instruction pipeline determines that the context 146 is consumed for the older instruction 142, the instruction pipeline may initiate fetching of the younger instruction 144 from a cache or memory of the processor, without waiting for the older instruction 142 to retire. In other words, the processor may initiate the fetching of the younger instruction 144 before the older instruction 142 retires or before the ISB instruction 140 becomes non-speculative. Note that sometimes there may be more than one older instruction 142. In that case, the instruction pipeline may wait until the contexts required for executing all the older instructions are consumed by the older instruction, and then initiate the fetching of younger instructions.

For example, sometimes a software program may include a store instruction 142 followed by an ISB instruction 140. The store instruction 142 may store or save data to a cache or memory. According to traditional non-speculative processing, the processor may wait until the store instruction 142 retires, e.g., until the data has been stored to the cache or memory, and then start to fetch the younger instruction 144. By comparison, according to the speculative processing described herein, the processor may determine whether addresses used by the store instruction 142 to access the cache or memory for storing the data are resolved, e.g., whether virtual addresses used by the store instruction 142 are translated to physical addresses. In responsive to a determination that the addresses are resolved, the processor may initiate fetching of the younger instruction 144, without waiting for the data to be stored and/or the store instruction 142 to retire.

As described above, sometimes the younger instruction 144 may have been previously fetched in to the instruction pipeline of the processor, e.g., before the execution of the ISB instruction 140. Therefore, prior to initiating the fetching, the execution of the ISB instruction 140 may first cause flushing of the instruction pipeline to remove the younger instruction 144 from the instruction pipeline, so that the younger instruction 144 may be re-fetched in to the instruction pipeline of the processor so that it may access updated contexts of the processor.

In the illustrated embodiment, since the younger instruction 144 is fetched before retirement of the older instruction 142, it may be possible that the younger instruction 144 may access data 148 before the data 148 is updated by the older instruction 142. For example, in the foregoing example, the younger instruction 144 may be a load instruction that loads or reads data from the cache or memory. Because the younger instruction 144 is fetched before the older instruction 142 retires, the younger instruction 144 may possibly load or read an old value of the data 148, before a new value is stored or saved by the older instruction 142. In other words, the data 148 accessed by the younger instruction 144 may be considered "poisoned," because it is accessed by the younger instruction 144 before it is later changed or updated by the older instruction 142.

In the illustrated embodiment, as part of the execution of the ISB instruction 140, the processor may determine whether the fetched younger instruction 144 causes loading of data 148 before the data 148 is updated by the older instruction 142, and if so, may flush the fetched younger instruction 144 from the instruction pipeline, such that the younger instruction 144 may be re-fetched to access the data 148 after it is updated by the older instruction 142. Sometimes, to accomplish this, the processor may use a data memory barrier (DMB) instruction to enforce an ordering constraint on memory accesses by different instructions. For example, the processor may use the DMB instruction to ensure that the memory access of the younger instruction 144 (e.g., loading of data 148 from memory) is performed after the memory access of the older store instruction 142 (e.g., storing of data 148 to the memory) is complete. Sometimes, the above may be performed when the ISB instruction becomes non-speculative. In other words, the processor may wait until the older instruction 142 retires and the ISB instruction 140 becomes non-speculative, and then determine whether the younger instruction 144 accesses poisoned data.

Figure 2:
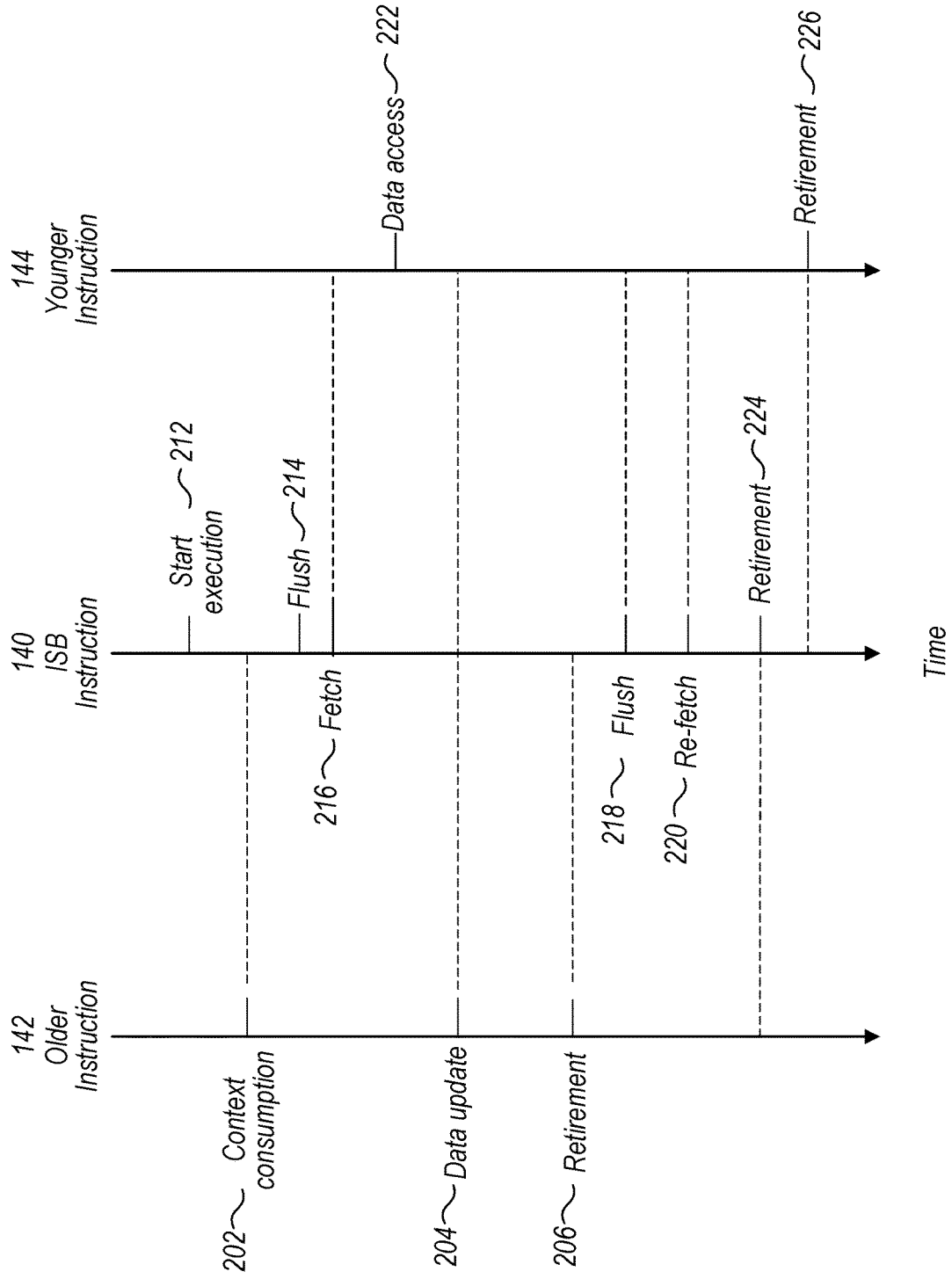
FIG. 2 is a block diagram to illustrate timing relationships during processing of an ISB instruction in a processor.

Turning now to FIG. 2, a block diagram to illustrate timing relationships during processing of an ISB instruction in a processor is shown. In the figure, different steps of the processing of older instruction 142, ISB instruction 140, and younger instruction 144 are illustrated relative to each other with respect to vertical time axes. For example, as indicated in FIG. 2, execution of the ISB instruction 140 may begin at point-in-time 212. As part of the execution of the ISB instruction 140, the processor may determine whether a context 146 required by the older instruction 142 is consumed for execution of the older instruction 142. At point-in-time 202, the processor may determine that the context 146 is consumed for the older instruction 142. In response, the processor may initiate fetching of the younger instruction 144 from the cache or memory at point-in-time 216. As described above, prior to the fetching, the processor may flush the instruction pipeline at point-in-time 214 to remove younger instructions that may have previously been fetched in to the instruction pipeline.

In the illustrated embodiment, the fetched younger instruction 144 may access poisoned data 148 at point-in-time 222 before the data is updated by the older instruction 142 at point-in-time 204. Therefore, processor may determine that the fetched younger instruction 144 accessed the poisoned data, and accordingly at point-in-time 218 may flush the fetched younger instruction 144 from the instruction pipeline to cause it to be re-fetched from the cache or memory at point-in-time 220. As described above, sometimes the processor may make the determination of the poisoned data access when the ISB instruction 140 becomes non-speculative, e.g., after the older instruction 142 retires at point-in-time 206. Finally, the ISB instruction 140 and younger instruction 144 may retire in order at points-in-time 224 and 226.

Sometimes, the processor may reside within a system (e.g., a system on a chip (SOC) 10 as described below) that includes one or more additional processors. Therefore, besides synchronizing instructions of the processor itself, the processor may also need to synchronize instructions with other different processors as part of processing the ISB instruction. This is because the above-described context-changing event may be caused by another processor. For example, a translation lookaside buffer invalidate (TLBI) instruction or an instruction buffer invalidate (ICINVAL) instruction by a second instruction may invalidate or remove entries in a translation lookaside buffer (TLB) or entries in an instruction buffer of a first processor. In combination with what is described above, the ISB instruction may also need to ensure that effects of such event-changing events are visible to fetched younger instructions.

Therefore, as part of the execution of the ISB instruction, the processor may determine whether an error occurs during the execution of the ISB instruction which may be associated with an update caused by another instruction to the contexts of the processor. In response to determine that the error occurs, the processor may flush the instruction pipeline. As a result, if a younger instruction is fetched in to the instruction pipeline before the update or context-changing event by the other processor, the younger instruction may be re-fetched, and thus the updated context may become visible to the re-fetched younger instruction. Sometimes, the processor may make the determination of such errors when the ISB instruction becomes non-speculative, e.g., after older instructions than the ISB instruction retire.

Sometimes, prior to execution of the ISB instruction, the processor may stall fetching of instructions once the ISB instruction is decoded. One benefit may be to reduce potential waste of resources, because the (younger) instructions fetched afterwards may be flushed from the instruction pipeline anyway during execution of the ISB instruction. Moreover, the processor may perform the speculative processing of the ISB instruction in various manners. For example, the processor may decode the ISB instructions in to one or more microoperations (μops), and use the individual μops to implement the above-described various features. Alternatively, the processor may use one or more state machines, e.g., in reference to the timing relationships in FIG. 2, to perform the speculative processing of an ISB instruction. In addition, in a software program, the ISB instruction that may be speculatively processed may follow instruction(s), e.g., a load instruction to load data from a cache or memory in to a register, a store instruction to store data from a register in to a cache or memory, a write instruction to write data in to a register, a read instruction to read data from a register, a translation look-ahead buffer invalidate instruction to invalidate an entry in a translation look-ahead buffer, or an instruction buffer invalidate instruction to invalidate an entry in an instruction cache of a processor.

Figure 3:
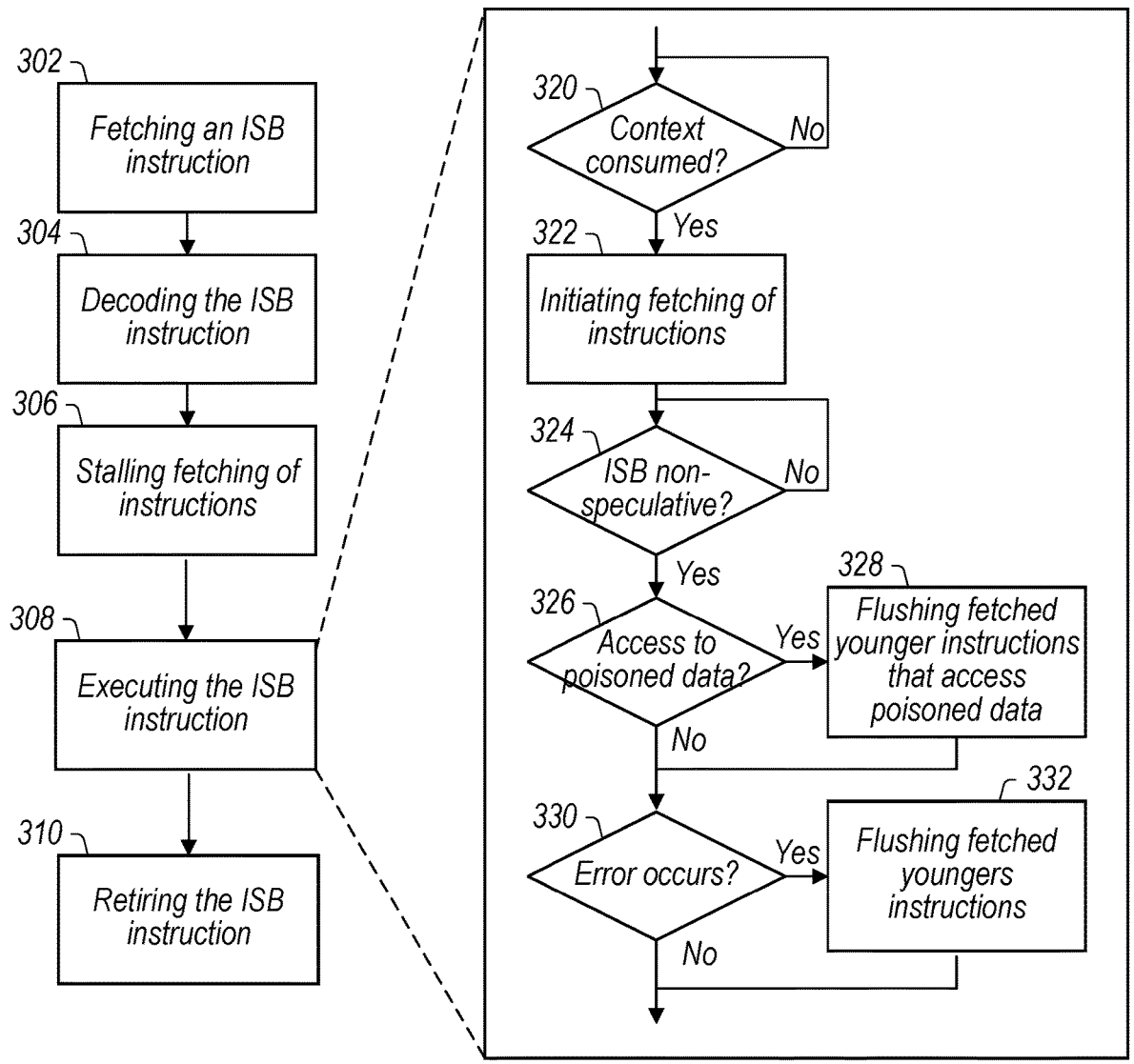
FIG. 3 is a flowchart illustrating an embodiment of speculative processing of an ISB instruction in a processor.

Turning now to FIG. 3, a flowchart illustrating an example embodiment of speculative processing of an ISB instruction in a processor is shown. In the illustrated embodiment, a processor may fetch an ISB instruction from an instruction cache, e.g., using a fetch and decode circuit of an instruction pipeline, as indicated by block 302. The processor may decode the fetched ISB instruction, e.g., using the fetch and decode circuit, as indicated by block 304. As described above, sometimes the processor may stall fetching of instructions after the ISB instruction is decoded, as indicated by block 306. In the illustrated embodiment, the processor may execute the decoded ISB instruction using the instruction pipeline, e.g., using an execution circuit or an execute unit, as indicated by block 308. For purposes of illustrated, the execution of the ISB instruction is decomposed in to further steps, as indicated by blocks 320-332. In addition, as described above, sometimes the instruction pipeline of the processor may include an out-of-order instruction pipeline.

In the illustrated embodiment, to execute the ISB, the processor may determine whether contexts required by older instructions than the ISB instruction are consumed for executing the older instructions, as indicated by block 320. As described above, the contexts of the processor may include various content and/or data representing and/or associated with states of the processor, such as data in registers, address space, stack space, virtual address space, program counter of the processor, etc. In response to determining that the contexts required are consumed by the older instructions, the processor may initiate fetching of youngers instructions without waiting for the older instructions to retire, as indicated by block 322. As described above, if the processor has previously stalled fetching of instructions at block 306, the initiation of the fetching may be considered as resuming the fetching of instructions. Also, as described above, compared to traditional non-speculative processing of ISB instructions, the ISB instruction may be processed speculatively without waiting for the older instructions to retire and the ISB instruction to become non-speculative.

In the illustrated embodiment, sometimes the fetched younger instructions may access poisoned data, e.g., before the data are updated by the older instructions. Therefore, the processor may determine whether the fetched younger instructions access poisoned data, as indicated by block 326. In response to determining that a fetched younger instruction accesses a poisoned data, the processor may flush the fetched younger instruction from the instruction pipeline, so that the younger instruction may be re-fetched and thus access the updated data, as indicated by block 328. As described above, to accomplished this, sometimes the processor may use a DMB instruction to enforce an ordering constraint on the memory accesses. In addition, as described above, sometimes the processor may make the determination of the poisoned data access when the ISB instruction becomes non-speculative, as indicated by block 324.

As described above, sometimes the processor may be part of a system (e.g., SOC 10 as described below) that includes one or more additional other processors. Therefore, besides synchronizing instructions of the processor itself, the processor may also need to synchronize instructions with the other processors. In the illustrated embodiment, the processor may determine whether an error occurs during the execution of the ISB instruction which may be associated with an update caused by another instruction to a context of the processor, as indicated by block 330. In response to determining that there is such an error, the processor may flush the fetched younger instructions from the instruction pipeline, as indicated by block 332. Also, as described above, sometimes the processor may make the determination of the error when the ISB instruction becomes non-speculative, as indicated by block 324. Finally, the processor may retire the ISB instruction, as indicated by block 310.

When the system includes multiple processors, the multiple processors may share a common memory system. For example, the multiple processors may individually process a thread, and the multiple threads collectively may operate on a same memory system. To ensure computational correctness, a mechanism may be needed to ensure memory coherence, such that the multi-processor shared memory system may function as a single atomic memory to the multiple threads of the different processors. To accomplish this, a processor may use a data synchronization barrier (DSB) instruction. In contrast to ISB instructions, the DSB instructions may enforce ordering constraints on memory accesses by different instructions. For example, a processor may use an DSB instruction to ensure memory accesses that occur before the DSB instruction to complete before completion of the DSB instruction. In other words, any update to memory by instructions older than the DSB instruction may become visible to instructions younger than the DSB instruction that access the memory. Sometimes the DSB instruction may block execution of the younger instructions until the DSB instruction is complete.

Figure 4:
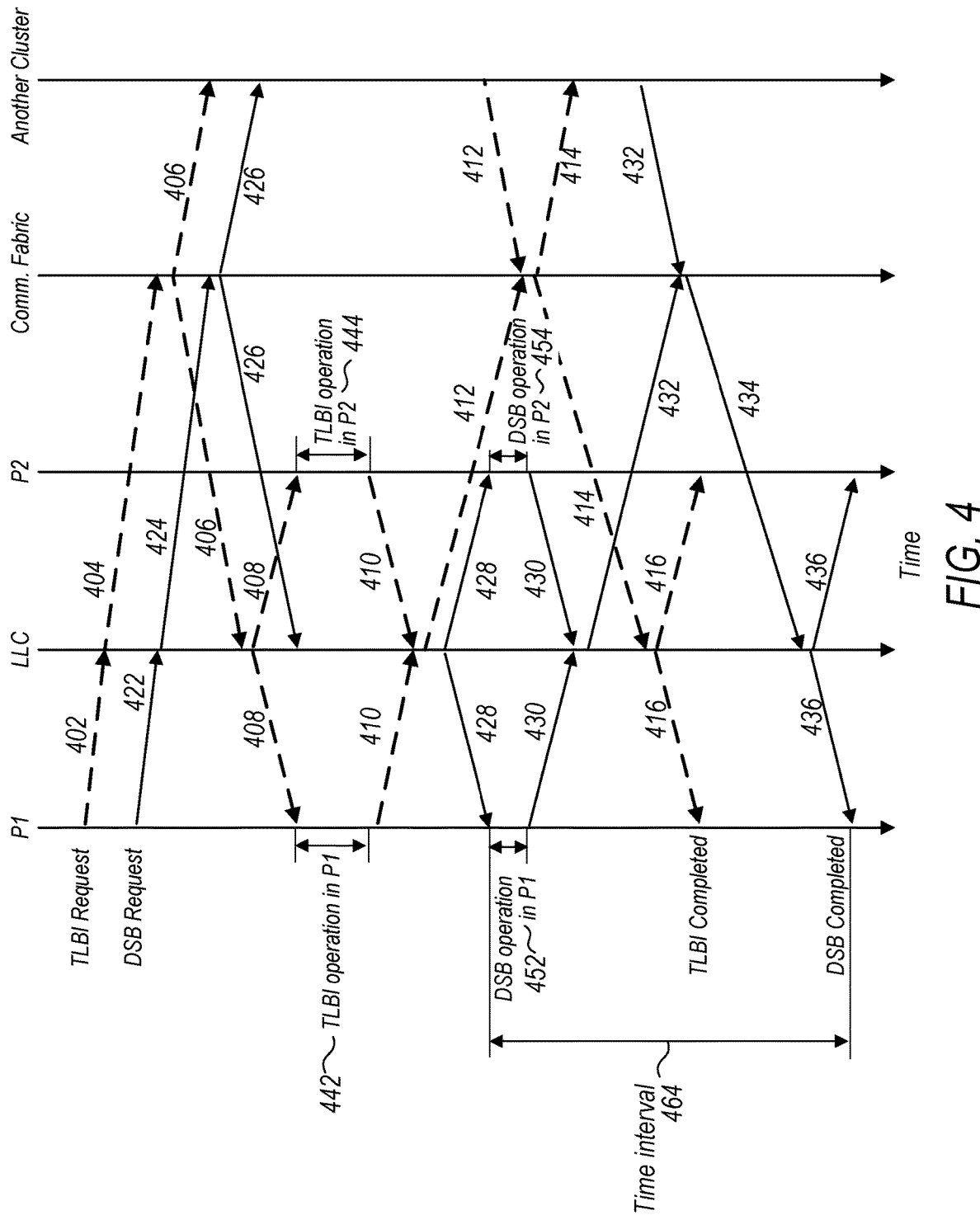
FIG. 4 is a block diagram to illustrate an embodiment for processing a data synchronization barrier (DSB) instruction in a multi-processor system.

Turning now to FIG. 4, a block diagram to illustrate an embodiment for processing a data synchronization barrier (DSB) instruction in a multi-processor system is shown. In the illustrated embodiment, a system (e.g., SOC 10 as described below) may include multiple processors clusters, each of which may further include one or more processors (e.g., one or more processors 30 as described below). For example, as indicated in FIG. 4, the system may include one cluster that includes a first processor (P1) and a second processor (P2), and another cluster having one or more additional processors. The processors P1 and P2 may share a last-level cache (LLC) within the cluster, and the cluster may communicate with the other clusters through a communication fabric (e.g., communication fabric 27 as described below). In FIG. 4, interactions between different components of the system during processing the DSB instruction are illustrated with respect to vertical time axes.

In the illustrated embodiment, for purposes of illustration, it is assumed that the DSB instruction follows a translation lookaside buffer invalidate (TLBI) instruction in a software program. A translation lookaside buffer (TLB) is a cache or address translations. Sometimes, a process may use virtual memory, as an abstraction, to represent physical memory such as actually storage resources that are available to the processor. To reduce time taken to access the physical memory, a processor may use the translation lookaside buffer to store recent translations of addresses of the virtual memory (or virtual addresses) to addresses of the physical memory (or physical addresses). The TLB may include multiple entries each of which may store a translation that maps a recently-used virtual address to a corresponding physical address. For each memory access performed by the processor, the processor may first check whether the translation is cached in the TLB. If the requested address translation causes a hit within the TLB, the translation of the address is immediately available. Sometimes, a processor may modify translation entries that may have been cached in the TLB, or change controls that affect how the entries are interpreted. Therefore, as part of the maintenance of the TLB, the processor may need to invalidate those entries (also called stale entries). For example, the processor may use an TLBI instruction to remove stale TLB entries from the TLB. When a system includes multiple processors that share a common memory system, each processor may have one TLB. Therefore, the TLB maintenance may need to be performed across the different processors, such that the stale translations are invalidated from the TLBs of all the processors. In that case, the processor may use the DSB instruction after the TLBI instruction to block memory accesses by all the processors until the TLBI instruction is complete.

For purposes of illustration, in the illustrated embodiment, it is assumed that the TLBI and DSB instructions are initially fetched and/or decoded in P1. For purposes of illustration, this processor is also called a sending processor, and the other processors are called remote processors. Sometimes, the system may use a broadcast-based mechanism to achieve "symmetric" processing of the TLBI and DSB instructions. As described below, the sending processors may broadcast indications to individual processors in the system to request TLBI and DSB-related operations, and the individual processors may report status of the operations, through one or more intermediaries, thus resulting in symmetric communications between the processors. With the symmetric broadcast, the individual processors may not necessarily distinguish whether the TLBI and DSB instructions are issued "locally" by itself or "remotely" by other processors. As a result, it may ensure that the processors prioritize the TLBI and DSB processing, regardless of where they may originate.

Referring back to FIG. 4, in the illustrated embodiment, after P1 fetches and decodes a TLBI instruction, P1 may broadcast an "upstream" indication to the LLC to indicate that the DSB is pending in P1, as indicated by signal 402. In response, the LLC may further broadcast the indication to the communication fabric, as indicated by signal 404. Next, the communication fabric may broadcast the indication to respective clusters, as indicated by signals 406. In turn, the LLC may receive the indication from the communication fabric, and then broadcast "downstream" indications to the processors in the cluster, e.g., P1 and P2, as indicated by signals 408. Sometimes, the "downstream" indications are also called "snoops."

After receipt of the "downstream" indications or snoops, P1 and P2 may respectively perform the requested TLBI-related operation. For example, P1 and P2 may invalidate a stale entry targeted or indicated by the TLBI instruction from their respective TLBs, as indicated by time intervals 442 and 444. In the illustrated embodiment, P1 and P2 may respective broadcast "upstream" acknowledgements to the LLC in response to the TLBI "downstream" indications or snoops, as indicated by signals 410. Again, the "upstream" acknowledgements may be first broadcasted to the LLC, which may be further broadcasted to the communication fabric, as indicated by signals 412.

The communication fabric may wait until receiving the "upstream" acknowledgement from the other cluster, as indicated by signal 412, and then broadcast "downstream" acknowledgements to the respective clusters, as indicated by signals 414. The "downstream" acknowledgements may be received first by the LLC, which may be further broadcasted to P1 and P2, as indicated by signals 416. The "downstream" acknowledgements may be considered as "global" acknowledgements, because they are transmitted from the communication fabric after receipt of acknowledgements from all the processors of the system. In response to receipt of the "downstream" or "global" acknowledgement, the sending processor (e.g., P1) may consider that the TLBI-related operation is complete.

The system may also use the broadcast-based symmetric mechanism to process the DSB instruction that follows the TLBI instruction. For example, as indicated in FIG. 4, after P1 fetches and decodes the DSB instruction, P1 may broadcast an "upstream" indication to the LLC to request DSB-related operation by the individual processors, as indicated by signal 422. In response, the LLC may broadcast the indication to the communication fabric, as indicated by signal 424. Next, the communication fabric may broadcast the indication to respective clusters, as indicated by signals 426. In turn, the LLC may receive the indication from the communication fabric, and then broadcast "downstream" DSB indications or snoops to P1 and P2, indicated by signals 428.

In response to receiving the "downstream" indications or snoops, P1 and P2 may respectively perform the requested DSB-related operation. For example, as part of the DSB-related operation, P1 may flush instructions younger than the DSB instruction, as indicated by time interval 452. Similarly, P2 may perform corresponding DSB-related operation during time interval 454. After completion of the TLBI-related operation, P1 and P2 may respective broadcast "upstream" acknowledgements to the LLC to signify their TLBI operation status, as indicated by signals 430. As indicated in FIG. 4, the "upstream" acknowledgements may first be broadcasted to the LLC, which may be further broadcasted to the communication fabric, as indicated by signals 432.

The communication fabric may wait until receiving the "upstream" acknowledgement from the other cluster, as indicated by signal 432, and then broadcast "downstream" acknowledgements to the respective clusters, as indicated by signals 434. The "downstream" acknowledgements may be received first by the LLC, which may be further broadcasted to P1 and P2, as indicated by signals 436. Similarly, because they are transmitted from the communication fabric after receipt of acknowledgements from all the processors of the system, the "downstream" acknowledgements may be considered as "global" acknowledgements. In response to receipt of the "downstream" or "global" acknowledgement, the sending processor (e.g., P1) may consider that the DSB-related operation is complete, and thus the DSB instruction may retire.

Traditionally, P1 may stall fetching of instructions after receiving the "downstream" DSB indication or snoop (as indicated by signal 428), and may resume the instruction fetching until it receives the "downstream" or "global" DSB acknowledgement (as indicated by signal 436). In other words, within time interval 464, P1 may stall fetching of instruction. This may cause undesired delays to operation of the instruction pipeline. Therefore, to improve performance, P1 disclosed herein may not stall fetching of instructions after it receives the "downstream" DSB request indication or snoop. Instead, P1 may continuously fetch instructions for decoding and execution, e.g., during the time interval 436, without waiting for the "downstream" or "global" DSB acknowledgement. In addition, as described above, sometimes after receiving the "downstream" DSB indication or snoop, P1 may flush instructions younger than the DSB instruction, e.g., at least those that have been previously fetched and/or decoded, and not issued for execution, from the processor's instruction pipeline.

Figure 5:
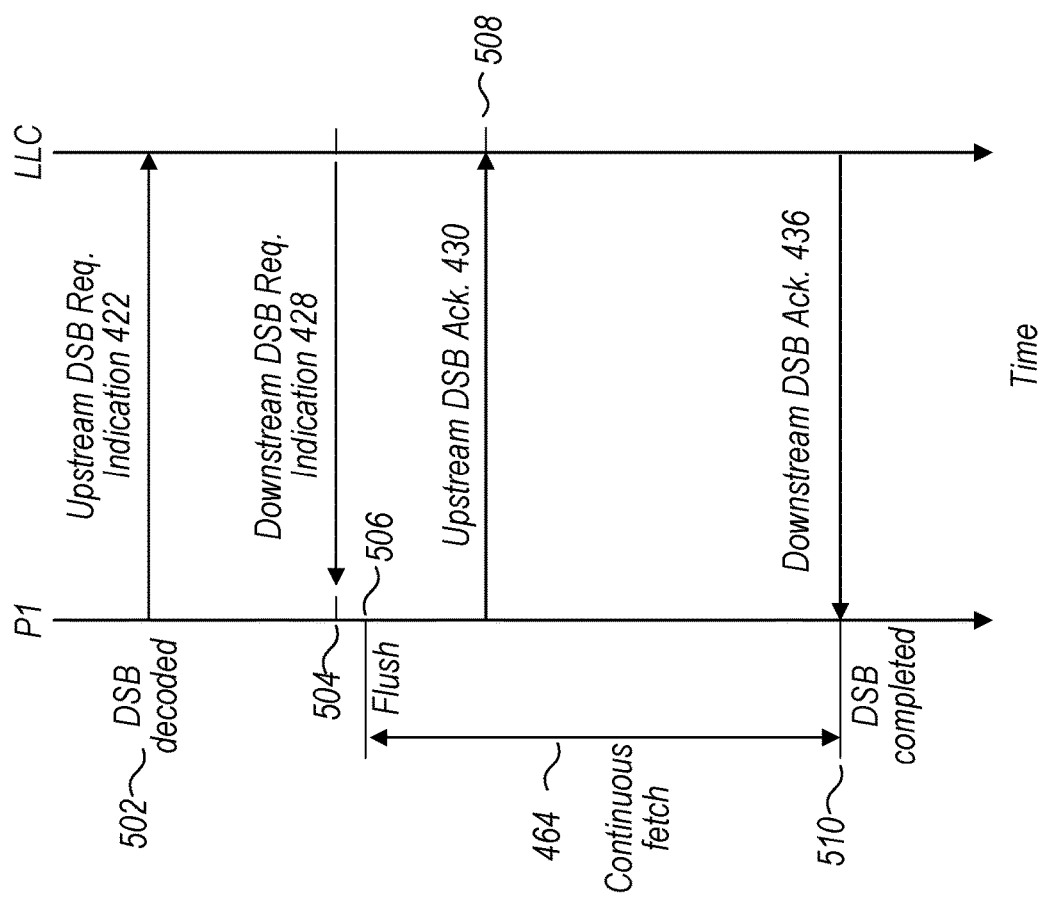
FIG. 5 is a block diagram to illustrate an embodiment for processing a DSB instruction in a sending processor.

Turning now to FIG. 5, a block diagram to illustrate an embodiment for processing a DSB instruction in a sending processor is shown. To simplify illustration, only a limited number of interactions between a sending processor (e.g., P1) and the corresponding LLC are shown in the figure. As indicated in FIG. 5, in the illustrated embodiment, at point-in-time 502, after an DSB instruction is decoded, P1 may broadcast an "upstream" indication to request DSB-related operation at individual processors of the system, as indicated by signal 422. The indication may be received by the LLC, which may be further broadcasted to a communication fabric and other processors, and at point-in-time 504, P1 may receive an "downstream" indication or snoop, as indicated by signal 428.

In the embodiment, at point-in-time 506, after receiving the "downstream" indication, P1 may flush instructions younger than the DSB instruction, e.g., at least those that have been previously fetched and/or decoded, and not yet issued to execution units for execution, from P1's instruction pipeline. After flushing, P1 may continue to fetch instructions in to the instruction pipeline. In addition, P1 may broadcast an "upstream" acknowledgement to the LLC, as indicated by signal 430. Finally, after all the processors send "upstream" acknowledgements, P1 may receive a "downstream" DSB acknowledgement from the LLC at point-in-time 510, as indicated by signal 436. Therefore, within the time interval 464, P1 may not stall operation and instead may continuously fetch instructions in to the instruction pipeline.

Sometimes, younger instructions that are continuously fetched by the sending processor may access data that are later updated by another remote processor, because the data accesses may occur before the sending processor receives the "downstream" or "global" acknowledgement. For example, prior to receiving the "downstream" or "global" acknowledgement, P1 may fetch a younger instruction that may further cause loading of data before the data is updated by P2. In other words, the younger instruction may access poisoned data. Therefore, sometimes P1 may determine whether there is such a poisoned data access, and if so, flush the younger instruction that accesses the poisoned data from the instruction pipeline, such that the younger instruction may be re-fetched and thus reaccess the data after it is updated.

Sometimes, an DSB instruction may be used in combination with an ISB instruction in a software program. For example, an ISB instruction may follow an DSB instruction in a software program, two of which collectively ensure ordering constraints on both instructions and memory accesses. Therefore, the above-described processing of DSB and ISB instructions may be combined for a processor to process the DSB and ISB instructions. For example, as to the DSB instruction, the processor may continuously fetch younger instructions without having to stall instruction fetching until receiving a "downstream" or "global" acknowledgement, e.g., representing or indicative of receipt of acknowledgements from at least the other processors. As to the ISB instruction, the processor may speculatively fetch younger instructions once contexts of the processor required by older instructions are consumed by the older instructions, without having to wait for the older instructions to complete and retire and the ISB instruction to become non-speculative. Also, note that the foregoing examples are provided only for purposes of illustration. In a software program, an DSB instruction may follow many different types of instructions, e.g., an TLBI instruction as described above, an instruction cache invalidate instruction to invalidate an instruction from an instruction cache, etc.

Figure 6:
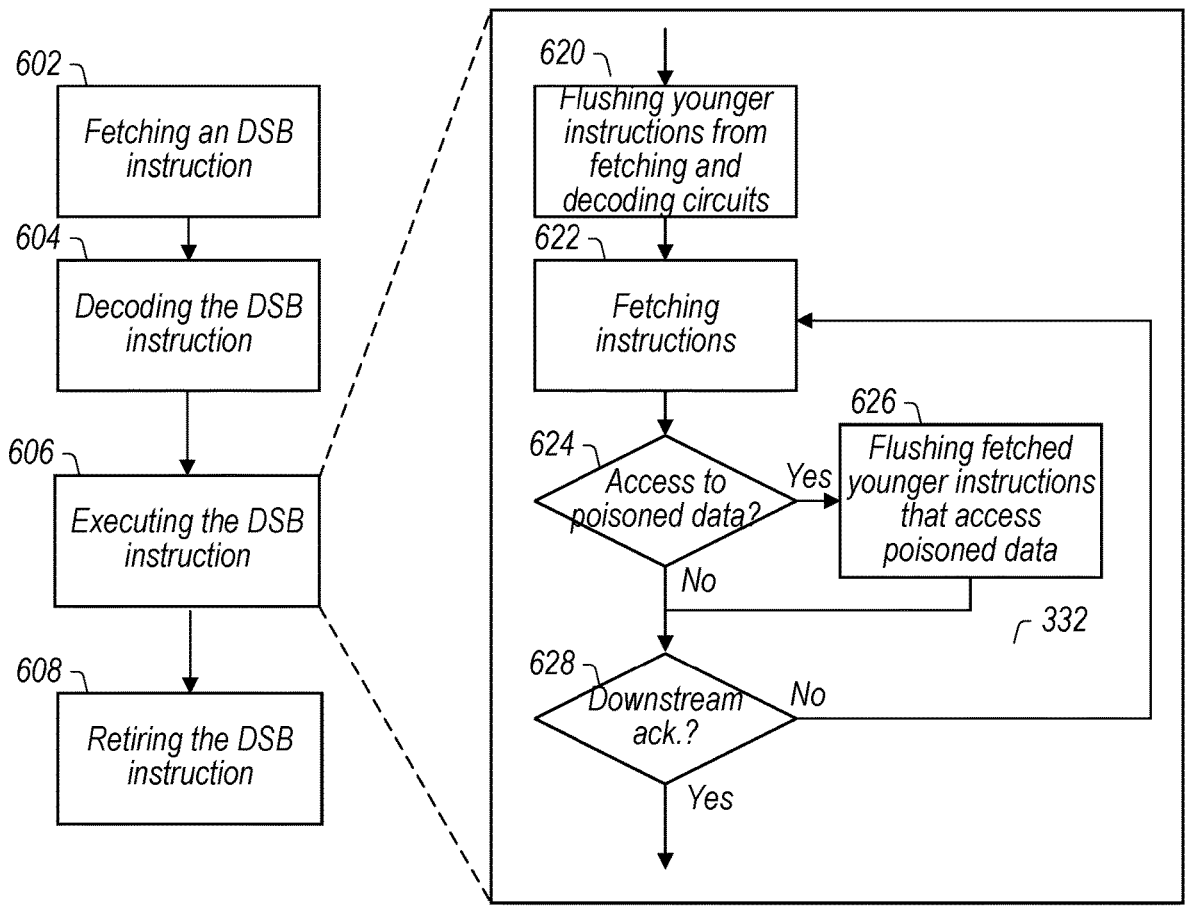
FIG. 6 is a flowchart illustrating an embodiment for processing a DSB instruction in a sending processor.

Turning now to FIG. 6, a flowchart illustrating an example embodiment for processing a DSB instruction in a sending processor is shown. In the illustrated embodiment, a processor may fetch an DSB instruction from an instruction cache, e.g., using an instruction fetch circuit of an instruction pipeline, as indicated by block 602. The processor may decode the fetched DSB instruction, e.g., using an instruction decoding circuit or decoder of the instruction pipeline, as indicated by block 604. Once decoded, the processor may execute the DSB instruction, as indicated by block 606. For purposes of illustrated, the execution of the DSB instruction is decomposed in to further steps, as indicated by blocks 620-628.

In the illustrated embodiment, to execute the DSB, the processor may flush younger instruction, e.g., at least those that have been previously fetched and/or decoded, and not yet issued to execution units for execution, from the processor's instruction pipeline, as indicated by block 620. Next, the processor may continue to fetch instructions, without waiting for a "downstream" or "global" acknowledgement from at least the other processors (e.g., through an intermediate LLC), as indicated by block 622. As described above, sometimes the processor may determine whether the fetched younger instructions access poisoned data, as indicated by block 624. In response to determine that the fetched younger instructions access poisoned data, the processor may flush the fetched younger instructions from the pipeline, such that they may be re-fetched, as indicated by block 626. The processor may determine whether it receives the "downstream" or "global" acknowledgement from at least the other processors, as indicated by block 628. In response to receipt of the "downstream" or "global" acknowledgement, the processor may consider that the DSB instruction is complete such that DSB instruction may be retired, as indicated by block 608.

What is described above, e.g., in FIGS. 5-6, is focused on the DSB-related operation in a sending processor (e.g., processor P1 as described above). As described above, in response to a "downstream" DSB indication or snoop (as indicated by signal 428), a remote processor (e.g., processor P2 as described above) may also perform requested DSB-related operation in collaboration with the sending processor (e.g., P1). For example, traditionally the remote processor may flush instructions younger than the DSB snoop from the instruction pipeline of the remote processor, before providing a DSB acknowledgement to the sending processor. However, this may flush away information that may not necessarily need to be flushed, and even useful information, especially if the flushed instructions do not touch the affected memory. Therefore, to improve performance and reduce waste of resources, the remote processor described herein may not necessarily flush the instruction pipeline in response to the DSB indication or snoop. Instead, the remote processor may determine status of memory accesses by individual instructions and accordingly provide the DSB acknowledgement. By doing this, the remote processor may avoid or at least reduce the number of instructions to be flushed, and therefore reduce instructions that need to be re-fetched. As a result, this may improve performance and save resources of the remote processor.

Still consider the foregoing example where an DSB instruction following a TLBI instruction is issued in the sending processor (e.g., P1). As described above, the TLBI instruction is used to invalidate stale entries in TLBs of individual processors. Therefore, the DSB instruction that follows the TLBI instruction may ensure that no instructions in the remote processor (e.g., P2) will use stale entries that are invalidated by the TLBI instruction to make memory accesses, once the remote processor completes the TLBI-related operation. However, the TLBI-related operation may be guaranteed to be complete only when the subsequent DSB following the TLBI is complete. In other words, the remote processor (e.g., P2) may be allowed to use TLB entries targeted or indicated by the TLBI instruction as long as the remote processor has not acknowledged the "downstream" DSB indication or snoop to the sending processor (e.g., P1). But once the DSB indication or snoop has been acknowledged, the remote processor (e.g., P2) may no longer make any memory accesses using the stale translations.

Therefore, the remote processor may not necessarily need to flush the instruction pipeline. Instead, the remote processor may only need to determine whether there are pending instructions for which virtual addresses are already translated to physical addresses before receipt of the DSB indication or snoop. If so, the remote processor may wait for the instructions to retire, and then provide the DSB acknowledgement to the sending processor. Note that the instructions may include instructions whose addresses may have been translated using TLB entries targeted or indicated by the TLBI instruction. As described above, use of those TLB entries to translate addresses may be allowed, as long as the addresses are translated before the remote processor provides the DSB acknowledgement to the sending processor. Sometimes, the remote processor may identify from the instructions the particular ones that may have used the stale entries to translate the addresses, and wait for only these particular instructions to retire to return the DSB acknowledgement, because the other instructions may not necessarily be affected by the TLBI instruction anyway.

Figure 7:
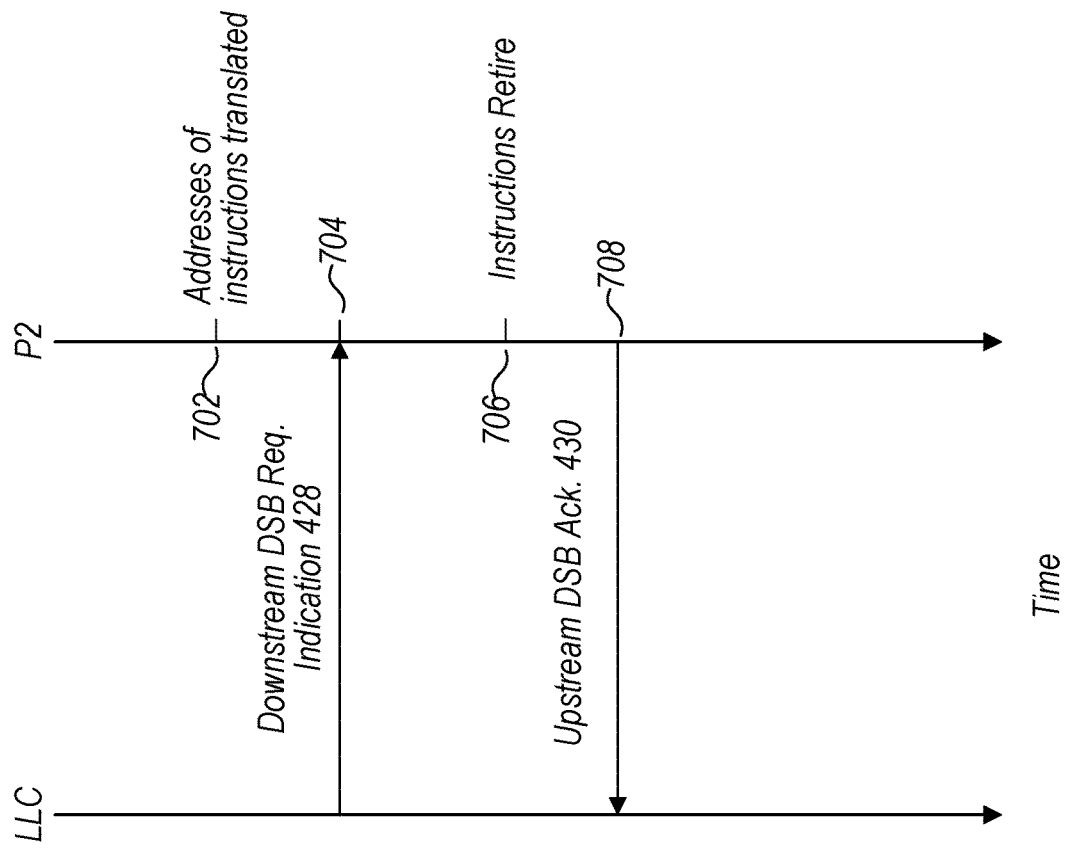
FIG. 7 is a block diagram to illustrate an embodiment for processing DSB-related operation in a remote processor.

Turning now to FIG. 7, a block diagram to illustrate an embodiment for processing DSB-related operation in a remote processor is shown. To simplify illustration, only a limited number of interactions between a remote processor ((e.g., processor P2 as described above) and the corresponding LLC are shown in the figure. As indicated in FIG. 7, at point-in-time 704, P2 may receive an indication or snoop of a DSB instruction that is pending and follows a TLBI instruction in another processor (e.g., sending processor P1 as described above), as indicated by signal 428 (also shown in FIG. 4). In response, P2 may determine whether a virtual address used by an instruction for a memory access has been translated to a physical address before receiving the indication or snoop of the DSB instruction. In the illustrated embodiment, there may be such a pending instruction for which the address translation has been completed at point-in-time 702, before receiving the indication of the DSB instruction at point-in-time 704. Therefore, P2 may wait until the instruction to retire, e.g., at point-in-time 706. Afterwards, e.g., at point-in-time 708, P2 may provide an acknowledgement to the sending processor in response to the received indication or snoop of the DSB instruction, as indicated by signal 430 (also shown in FIG. 4).

The remote processor may use various approaches to track which instructions have their translation completed before receipt of the DSB indication. For example, the remote processor may use a value-based or "color-based" scheme. For example, the remote processor may maintain two sets of bits, one set of reference bits and another set of translation bits. Each bit may two different values, e.g., zero and one, to may represent different "colors." Each instruction may correspond to one reference bit and one translation bit. At beginning, the remote processor may clear the reference bits to zero. When addresses of an instruction are translated, the remote processor may assign a translation bit to the instruction. If the addresses are translated before receipt of the DSB indication, the remote processor may assign the same value as the reference bit, e.g., zero, to the translation bit corresponding to the instruction. Conversely, if the addresses are not translated before receipt of the DSB indication, the remote processor may assign a different value, e.g., one, to the translation bit of the instruction. Therefore, for each instruction, the remote processor may compare the reference bit and translation bit of the instruction to determine whether or not the addresses of the instruction are translated after the receipt of the DSB indication. For example, if value of the reference bit equals value of the translation bit, it means that the instruction's addresses are translated before the DSB indication, whereas if values of the two bits are different, the addresses are not translated before receiving the DSB indication.

In addition, after the remote processor sends the DSB acknowledgement to the sending processor, the remote processor may update values of the reference bits, e.g., by setting them to ones, therefore the above-described value-based or color-based scheme may be repeatedly performed. Sometimes, the first set of reference bits may be replaced with one single reference bit, e.g., all instructions share one single reference bit. The remote processor may use the single reference bit to track the instructions, instead of assigning respective reference bit to individual instructions. Either way, with the above-described mechanism, the remote processor may not necessarily need to flush its instruction pipeline in response to the DSB indication or snoop from the sending processor.

Figure 8:
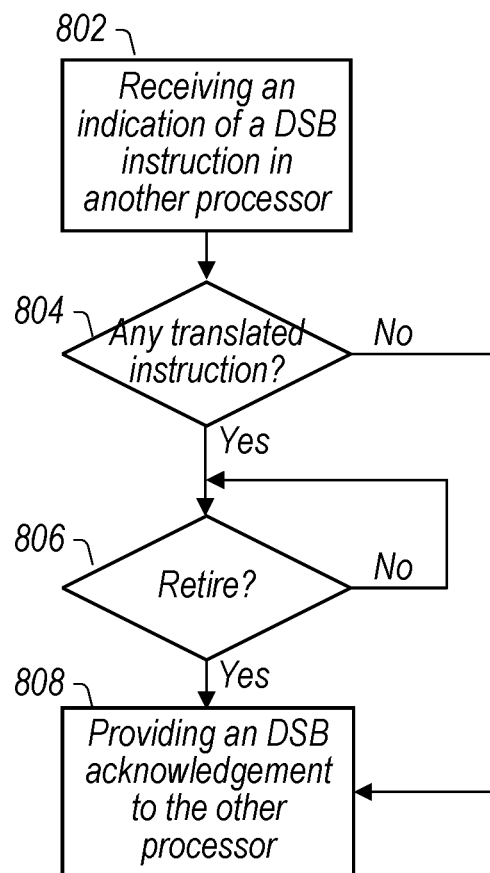
FIG. 8 is a flowchart illustrating an embodiment for processing DSB-related operation in a remote processor.

Turning now to FIG. 8, a flowchart illustrating an example embodiment for processing DSB-related operation in a remote processor is shown. In the illustrated embodiment, a remote processor (e.g., processor P2 as described above) may receive an indication or snoop of a DSB instruction (e.g., indicated by signal 428 as described above) that follows a translation look-ahead buffer invalidate (TLBI) instruction in a sending processor (e.g., P1), as indicated by block 802. In response to the DSB indication or snoop, the remote processor may determine whether instructions are pending for which virtual addresses used for memory accesses have been translated to physical addresses before receiving the indication or snoop of the DSB instruction, as indicated by block 804. If so, the remote processor may wait until the instructions of the processor retire, as indicated by block 806. For example, if an address used by an instruction for loading data to memory is already translated before the DSB indication or snoop, the remote processor may wait for the data to be loaded to the memory. After the data is loaded using the translated address, the instruction retires, the remote processor may then provide a DSB acknowledgement to the sending processor in response to the received indication or snoop of the DSB instruction.

Figure 9:
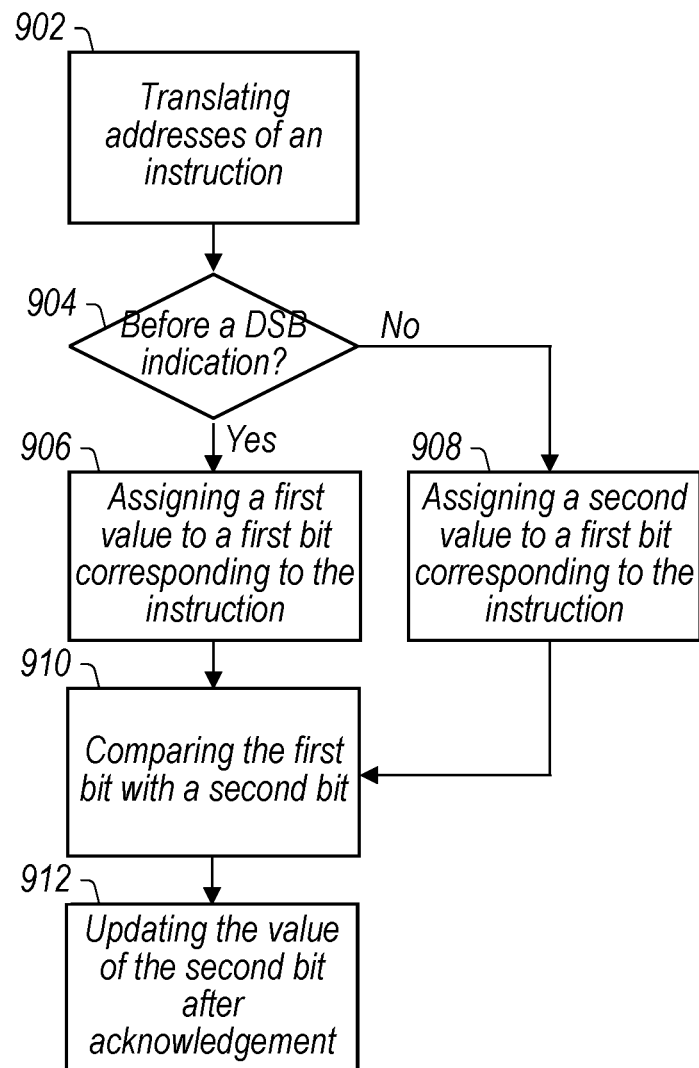
FIG. 9 is a flowchart illustrating another embodiment for processing DSB-related operation in a remote processor.

Turning now to FIG. 9, a flowchart illustrating another example embodiment for processing DSB-related operation in a remote processor is shown. In the illustrated embodiment, a remote processor (e.g., processor P2 as described above) may translate virtual addresses used by an instruction for memory access(es) to physical addresses, as indicated by block 902. The remote processor may determine whether the addresses are translated before receiving an indication of an DSB instruction following a TLBI instruction in a sending processor (e.g., P1), as indicate by block 904. If so, the remote processor may assign a first value to a first bit corresponding the instruction, e.g., assigning a value zero to a translation bit for the instruction, as indicated by block 906. Otherwise, the remote processor may assign a second value to the first bit corresponding to the instruction, e.g., assigning a value one to the translation bit for the instruction, as indicated by block 908. The remote processor may compare the value of the first bit (e.g., the translation bit) with the value of a second bit (e.g., a reference bit), as indicated by block 910. Based on the comparison, the remote processor may determine whether or not the instruction's translation is completed before receipt of the DSB indication. For example, as described above, the remote processor may assign a value one to the reference bit ahead of time. Therefore, if values of the first and second bits equal each other, it means that the translation is completed before the DSB indication. Otherwise, if the values are different from each other, it means that the translation is completed after the DSB indication. In addition, after the remote processor provides an DSB acknowledgement to the sending processor, the remote processor may update the value of the second bit, as indicated by block 912. For example, the remote processor may flip the value of the reference bit from zero to one, and therefore the above-described operation may be repeatedly performed.

As described above, in the foregoing example, when the DSB instruction follows a TLBI instruction, the remote processor may receive a "downstream" indication or snoop of the TLBI instruction in the sending processor (e.g., as indicated by signal 408 in FIG. 4) before receipt of the "downstream" indication or snoop of the DSB instruction (e.g., as indicated by signal 428 in FIGS. 4 and 7). Sometimes, the remote processor may not necessarily invalidate the TLB entries targeted or indicated by the TLBI instruction once receiving the "downstream" indication or snoop of the TLBI instruction. Instead, the remote processor may only identify or mark those stale TLB entries, e.g., using one or more values kept in a register. The remote processor may wait until receiving the subsequent "downstream" indication or snoop of the DSB instruction, and then invalidate the stale TLB.

Figure 10:
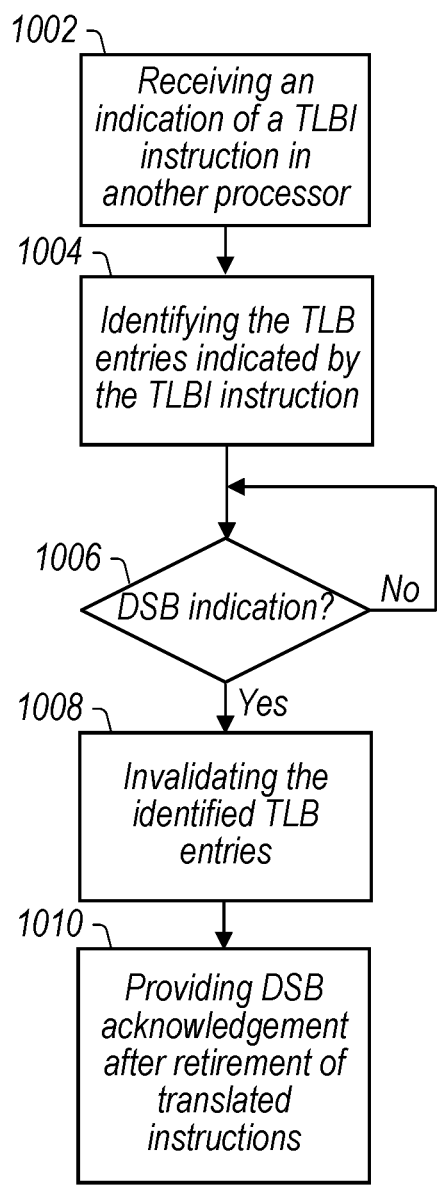
FIG. 10 is a flowchart illustrating an embodiment of invalidating TLB stale entries in a remote processor.

Turning now to FIG. 10, a flowchart illustrating an example embodiment of invalidating TLB stale entries in a remote processor is shown. In the illustrated embodiment, a remote processor (e.g., processor P2 as described above) receives a "downstream" indication or snoop of an TLBI instruction in another processor (e.g., sending processor P1 as described above), as indicated by block 1002. As described above, the TLBI indication may indicate one or more stale entries in the remote processor's TLB that are required to by invalidated by the remote processor. Also, in the illustrated embodiment, the TLBI instruction may be followed by a DSB instruction. As indicated in FIG. 10, when the remote processor receives the TLBI indication, the remote processor may not necessarily immediately invalidate the indicated stale TLB entries. Instead, the remote processor may only identify the indicated TLB entries to be invalidated in response to the TLB instruction, as indicated by block 1004. In addition, the remote processor may determine whether it receives a "downstream" indication or snoop of a DSB instruction that follows the TLBI instruction in the other processor, as indicated by block 1006. Until the DSB indication is received, the remote processor may invalidate the identified stale TLB entries, as indicated by block 1008. In addition, the remote processor may process the DSB-related operation in response to the DSB indication, as described above, e.g., in FIGS. 7-9. For example, the remote processor may not necessarily flush the instruction pipeline. Instead, the remote processor may determine whether instructions are pending in the remote processor for which virtual addresses used for memory accesses have already been translated to physical addresses before receipt of the DSB indication. If so, the remote processor may wait until those instructions to retire, and then provide an acknowledgement to the other processor in response to the DSB indication, as indicated by block 1010.

Figure 11:
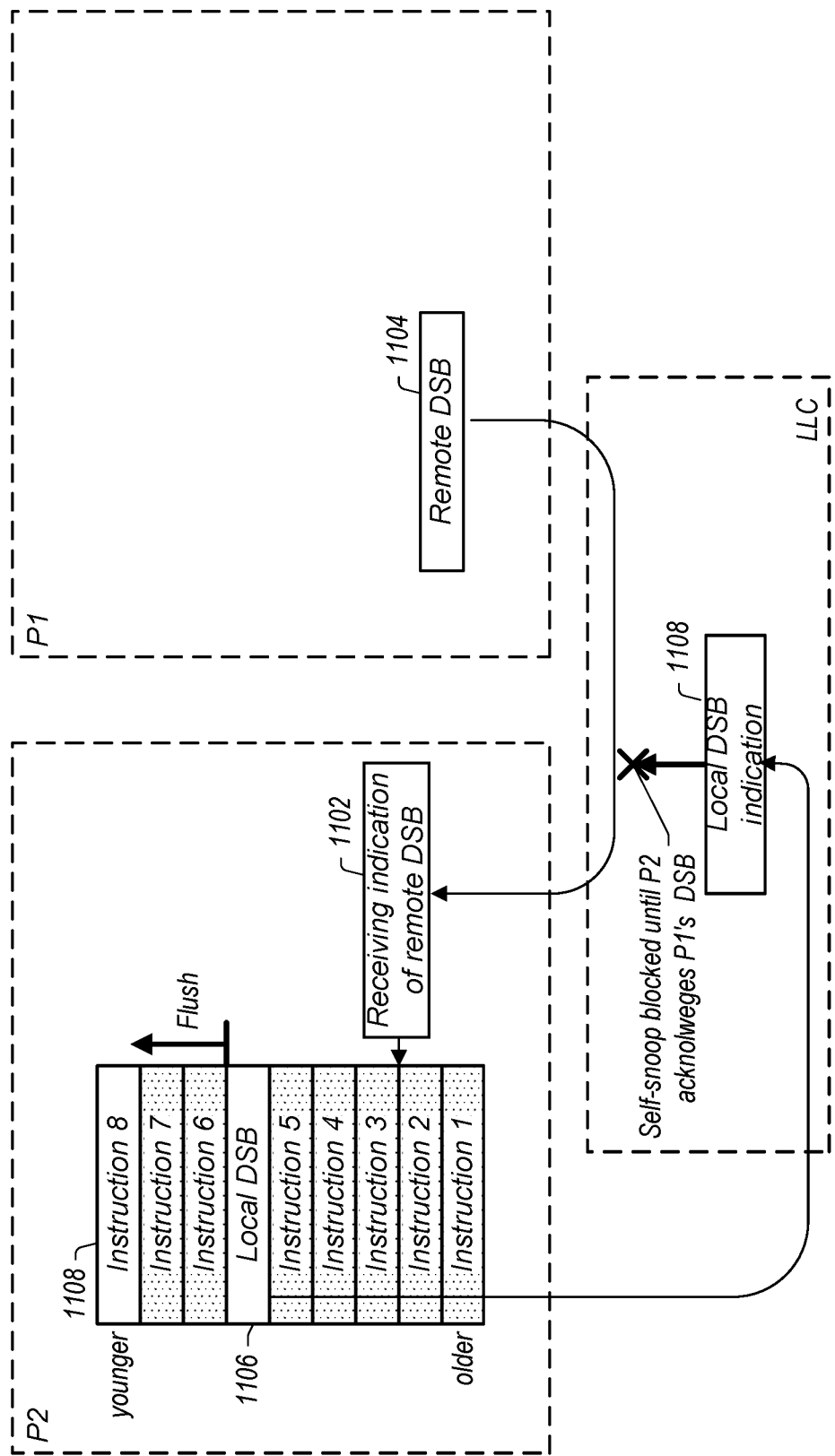
FIG. 11 is a block diagram illustrating an embodiment where a remote processor may need to flush an instruction pipeline.

As described above, most time the remote processor may not need to flush the instruction pipeline in response to receiving a DSB indication or snoop from a sending processor. However, sometimes there may be still scenarios where the remote processor needs to flush its instruction pipeline. Turning now to FIG. 11, a block diagram illustrating an example embodiment where a remote processor may need to flush an instruction pipeline is shown. In the illustrated embodiment, a remote processor (e.g., processor P2 as described above) may receive an indication 1102 of a DSB instruction 1104 (hereinafter a "remote" DSB instruction) in a sending processor (e.g., processor P1 as described above). As described above, sometimes the indication 1102 may be broadcasted from P1 to P2 through an LLC. In the illustrated embodiment, before receiving the indication 1102, there may be several instructions in P2 for which addresses are already translated, e.g., instructions 1-7 as indicated in FIG. 11. In addition, there may be a "local" DSB instruction 1106 issued by P2 itself. In the illustrated embodiments, the local DSB instruction 1106 may be fetched, decoded, and issued by P2 to execution units for execution, after receiving the DSB indication 1102. Further, as indicated in FIG. 11, instructions 1-5 in P2 are older than the local DSB instruction 1106 according to a program order, whereas instructions 6-7 are older than the local DSB instruction 1106.

As indicated in FIG. 11, P2 may broadcast an indication 1108 of the local DSB instruction 1106 to P1 via the LLC. As described above, e.g., in FIG. 4, P2 may not execute the local DSB instruction 1106 until after it receives the indication 1108 broadcasted back from the LLC. However, the LLC receives the indication 1102 of the remote DSB instruction 1104 prior to the indication 1108 of the local DSB instruction 1106, the LLC may prioritize the processing of the remote DSB instruction 1104, and thus not broadcast the indication 1108 of the local DSB instruction 1106 until after the remote DSB instruction 1104 is complete. In other words, the broadcast of the indication 1108 may be "blocked" at the LLC. As a result, P2 may not execute the local DSB instruction 1106, before it acknowledges the remote DSB instruction 1104. As described above, P2 may not acknowledge in response to the indication 1102 of the remote DSB instruction 1104, until after instructions 1-7 retire. Meanwhile, instructions 6-7 may not be able to retire until after the local DSB instruction 1106 (that is older than the instructions 6-7) retires. Therefore, this may create a "deadlock." To resolve the deadlock, in the illustrated embodiment, P2 may flush instructions that are younger than the local DSB instruction 1106 from P2's instruction pipeline, including instructions 6-7 for which the addresses are already translated before receipt of the indication 1102 of the remote DSB instruction 1104.

Figure 12:
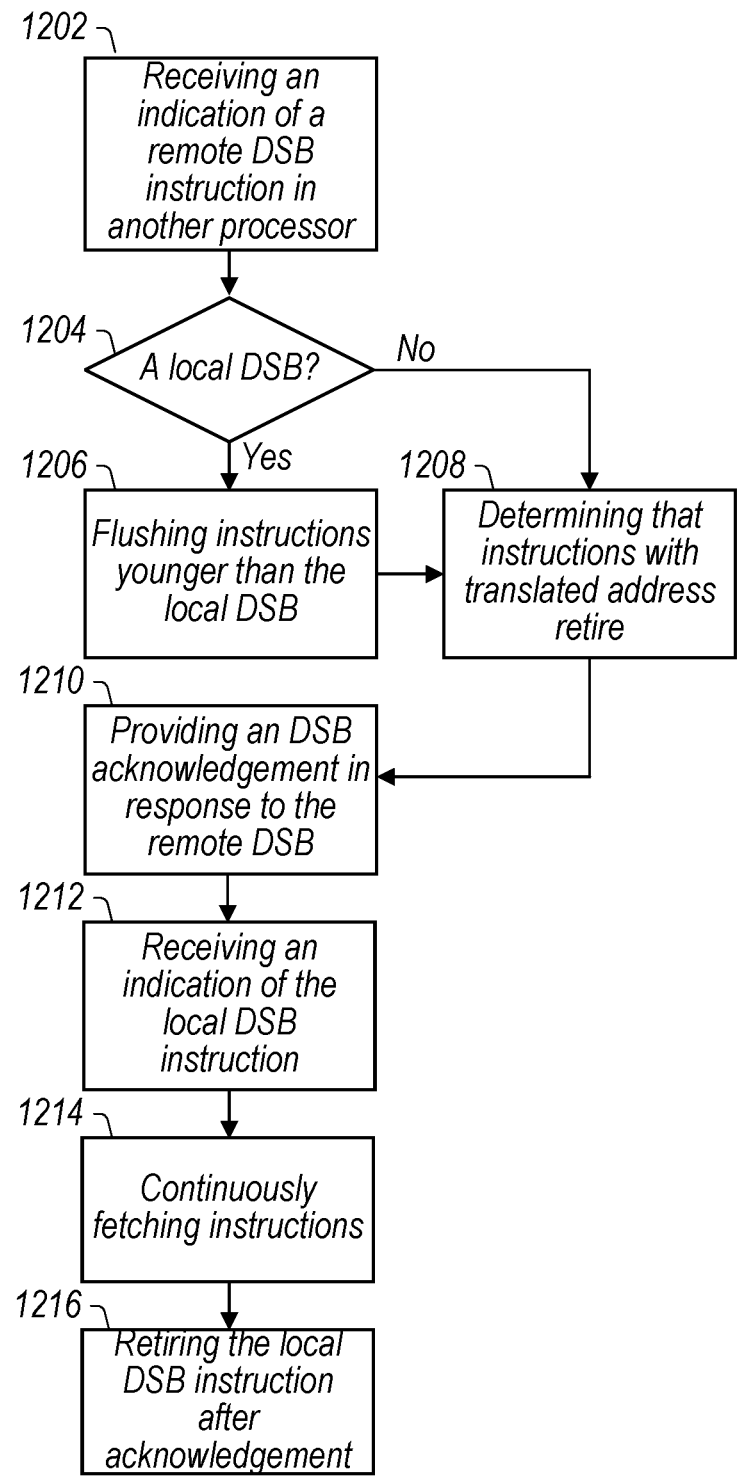
FIG. 12 is a flowchart illustrating an embodiment for processing DSB-related operation in a remote processor to resolve a deadlock.

Turning now to FIG. 12, a flowchart illustrating an example embodiment for processing DSB-related operation in a remote processor to resolve the deadlock is shown. In the illustrated embodiment, a remote processor (e.g., processor P2 as described above) may receive an indication of a remote DSB instruction following a TLBI instruction in a sending processor (e.g., processor P1 as described above), as indicated by block 1202. The remote processor may determine whether there is a local DSB instruction issued by P2 after receipt of the indication of the remote DSB instruction, as indicated by block 1204. If so, the remote processor may flush instructions younger than the local DSB instruction from an instruction pipeline of the processor, as indicated by block 1206. Note that the instructions may include those for which virtual addresses used for memory accesses are already translated to physical addresses before receipt of the indication of the remote DSB instruction. Therefore, sometimes the remote processor may identify these particular instructions, and only flush these particular instructions from the instruction pipeline. In addition, the remote processor may determine that instructions in the remote processor for which the addresses are already translated before the indication of the remote DSB instruction have retired, as indicated by block 1208. In response to determining that the instructions have retired, the remote processor may provide an acknowledgement to the sending processor in response to the indication of the remote DSB instruction, as indicated by block 1210.

After acknowledging the remote DSB instruction, the remote processor may process the local DSB instruction. For example, the remote processor may receive an indication of the local DSB instruction, as indicated by block 1212. Since this is a local DSB instruction, the remote processor may process the DSB instruction as a sending processor, as described above in FIGS. 5-6. For example, the remote processor may continuously fetch instructions without waiting for an DSB acknowledgement from at least the other processor, such as the sending processor P1, as indicated by block 1214. After receiving the DSB acknowledgement, the remote processor may retire the local DSB instruction, as indicated by block 1216.

Figure 13:
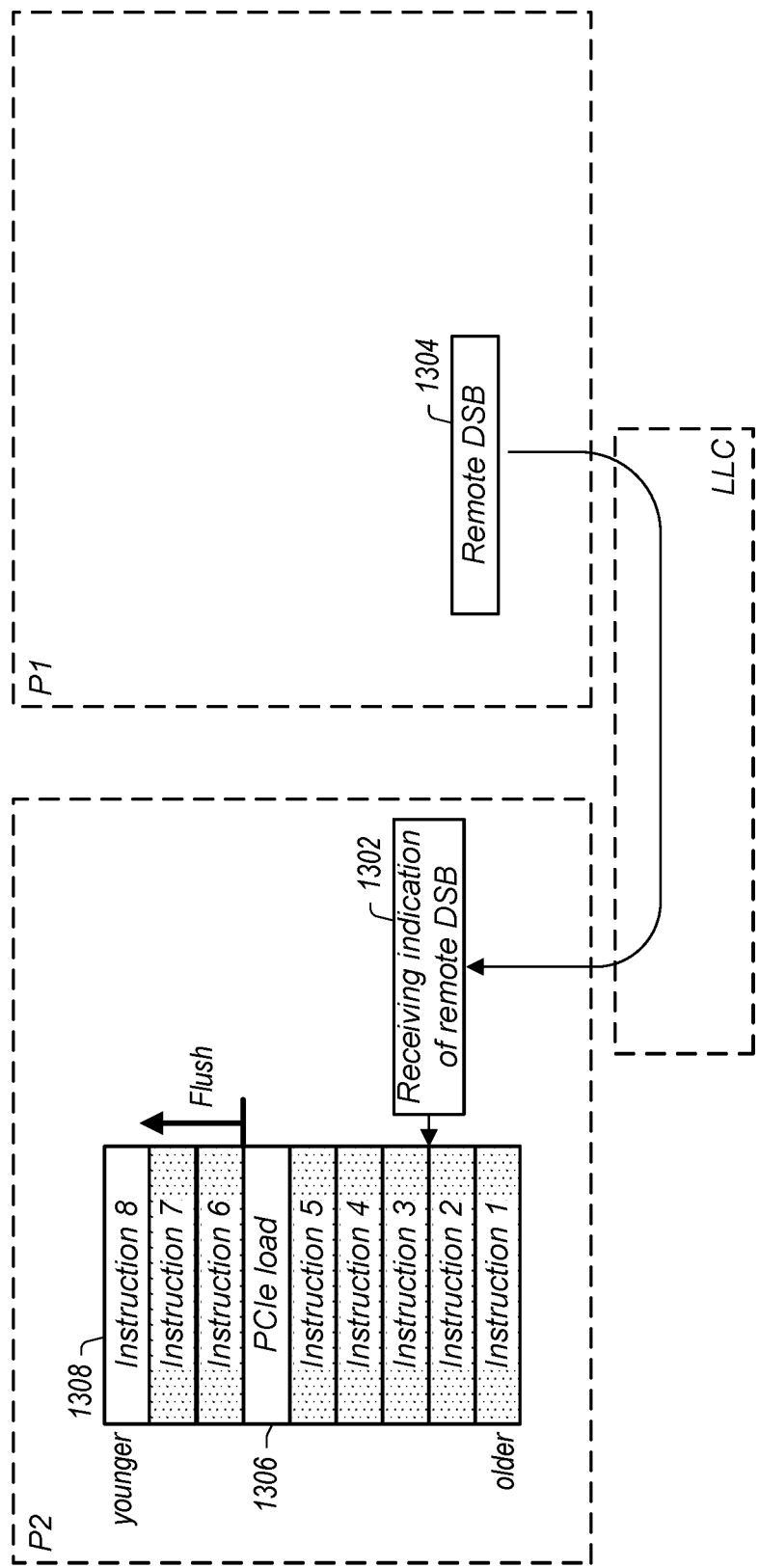
FIG. 13 is a block diagram illustrating another embodiment where a remote processor may need to flush an instruction pipeline.

Turning now to FIG. 13, a block diagram illustrating another example embodiment where a remote processor may need to flush an instruction pipeline is shown. In the illustrated embodiment, a remote processor (e.g., processor P2 as described above) may receive an indication 1302 of a DSB instruction 1304 (hereinafter a "remote" DSB instruction) in a sending processor (e.g., processor P1 as described above). In addition, there may be an instruction 1306 issued locally in P2 that loads data through a Peripheral Component Interconnect Express (PCIe) interface of the remote processor. As indicated in FIG. 13, in the illustrated embodiments, in P2, virtual addresses of instructions 1-7 may have been translated to physical addresses before receipt of the indication 1302 of the remote DSB instruction 1304. Further, instructions 1-5 may be younger than the PCIe load instruction, whereas instructions 6-7 may be younger than the PCIe load instructions.

As described above, P2 may need to wait until instructions 1-7 to retire, before it provides an acknowledgement in response to the indication 1302 of the remote DSB instruction 1304 back to P1. However, because instructions 6-7 are younger than the PCIe instruction, they may not be able to retire until after the PCIe instruction is completed. Sometimes, the completion of the PCIe instruction may take a quite amount of time, which may further cause undesirable delays to processing of the DSB instruction across the processors P1 and P2. In other words, the sending processor P1 may have to pay for the penalty of the time-consuming PCIe load instruction, even though it is issued locally in P2. Therefore, to improve performance, P2 may flush instructions that are younger than the local PCIe load instruction 1306 from P2's instruction pipeline, including instructions 6-7 for which the addresses are already translated before receipt of the indication 1302 of the remote DSB instruction 1304.

Figure 14:
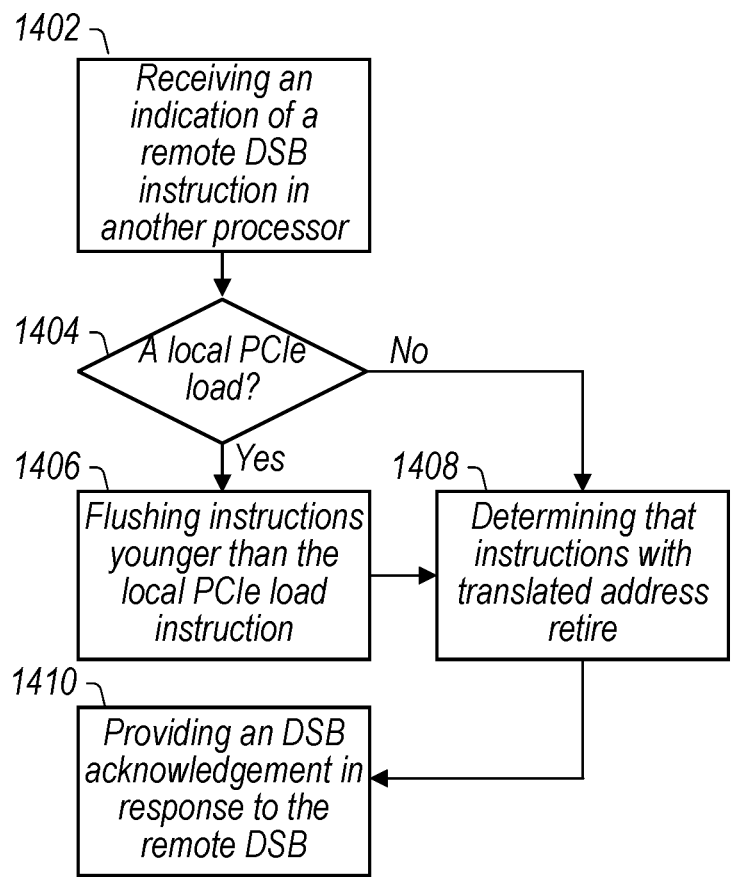
FIG. 14 is a flowchart illustrating an embodiment for processing DSB-related operation in a remote processor to address delays caused by a PCIe load instruction.

Turning now to FIG. 14, a flowchart illustrating an example embodiment for processing DSB-related operation in a remote processor to address delays caused by a PCIe load instruction is shown. In the illustrated embodiment, a remote processor (e.g., processor P2 as described above) may receive an indication of a remote DSB instruction following a TLBI instruction in a sending processor (e.g., processor P1 as described above), as indicated by block 1402. The remote processor may determine whether there is a local PCIs load instruction issued by P2 after receipt of the indication of the remote DSB instruction, as indicated by block 1404. If so, the remote processor may flush instructions younger than the local PCIe load instruction from an instruction pipeline of the processor, as indicated by block 1406. Note that the instructions may include those for which virtual addresses used for memory accesses are already translated to physical addresses before receipt of the indication of the remote DSB instruction. Therefore, sometimes the remote processor may identify these particular instructions, and only flush these particular instructions from the instruction pipeline. In addition, the remote processor may determine that instructions in the remote processor for which the addresses are already translated before the indication of the remote DSB instruction have retired, as indicated by block 1408. In response to determining that the instructions have retired, the remote processor may provide an acknowledgement to the sending processor in response to the indication of the remote DSB instruction, as indicated by block 1410.

Note that the above examples are provided only as examples for purposes of illustration. A DSB instruction may not necessarily follow a TLBI instruction, but other types of instructions. For example, sometimes a DSB instruction may follow an instruction cache invalidate instruction to invalidate an instruction from an instruction cache. In that case, the DSB instruction to enforce an ordering constraint on memory accesses may not necessarily be sufficient. Instead, the sending processor of the instruction cache invalidate instruction may require the other remote processors to flush their instruction pipelines. In other words, the sending processor may need a separate ISB instruction to enforce an ordering constraint on the instructions across the different processors, which may cause the individual processors to flush their respective instruction pipelines. However, addition of the separate ISB instruction may cause undesired complexity to the operation of the processors. Therefore, instead of issuing a separate ISB instruction, the sending processor may modify the DSB instruction that follows the instruction cache invalidate instruction to cause the DSB instruction to provide a combined functionality of a DSB instruction and an ISB instruction. For example, when the sending processor fetches and/or decodes instructions, it may recognize that an instruction cache invalidate instruction is followed by a DSB instruction (but without an additional ISB instruction). In response, the sending processor may decode the DSB instruction to add one or more microoperations to perform an ISB operation. Further, when the sending processor sends a "downstream" indication or snoop of the modified DSB instruction to another processor, the sending processor may also add information in the DSB indication or snoop to signify the other processor to similarly add the ISB operation. In response, when the remote processor receives the indication or snoop of the modified DSB instruction, the remote processor may perform the required ISB-related operation, e.g., to flush the instruction pipeline, although the remote processor does not necessarily receive an indication or snoop of a separate ISB instruction.

Figure 15:
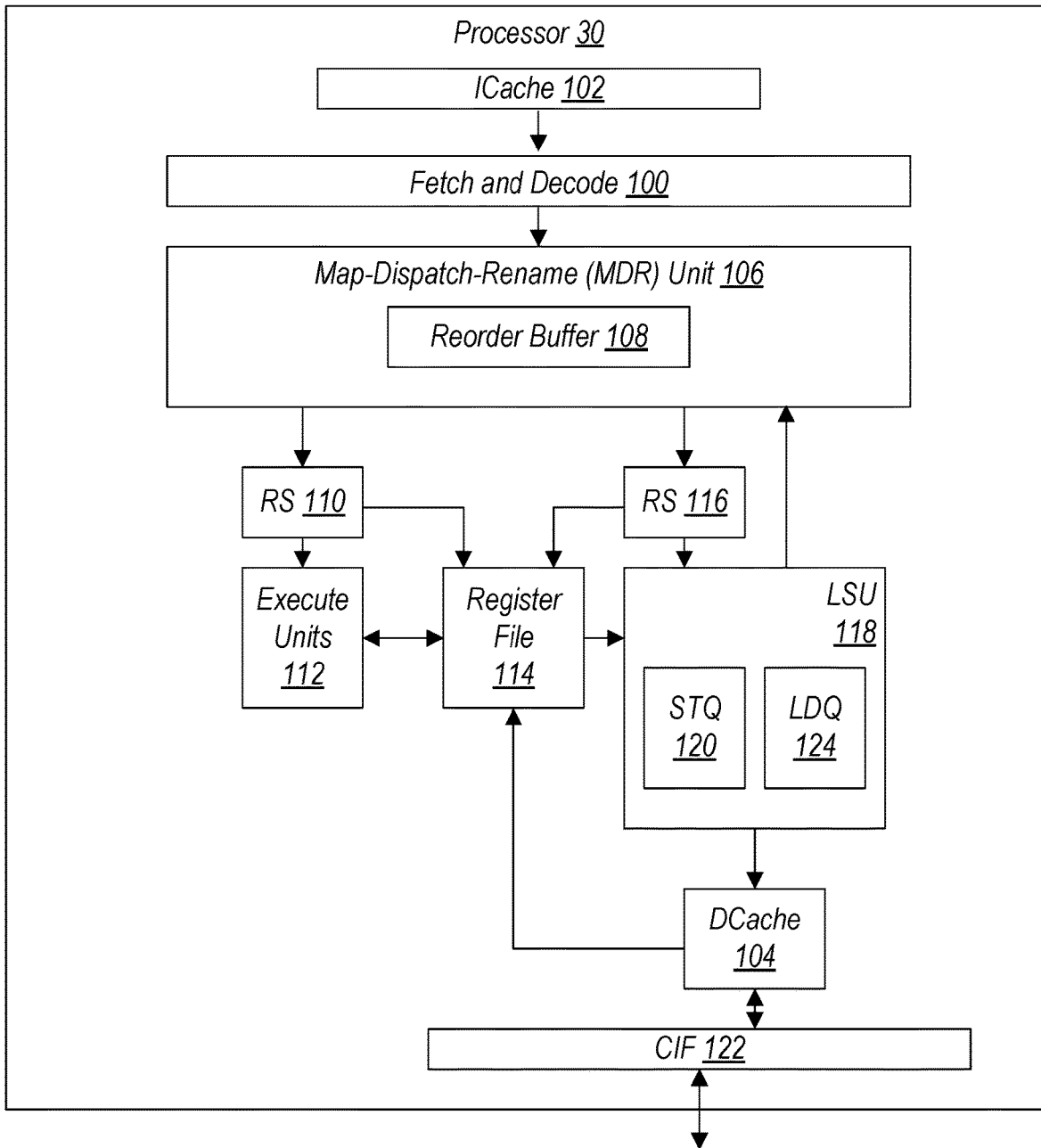
FIG. 15 is a block diagram of one embodiment of a processor shown in FIGS. 1-14 that includes a load miss management circuit.

FIG. 15 is a block diagram of one embodiment of a processor 30 in more detail. In the illustrated embodiment, the processor 30 includes a fetch and decode unit 100 (including an instruction cache, or ICache, 102), a map-dispatch-rename (MDR) unit 106 (including a reorder buffer or ROB 108), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 28. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124).

The fetch and decode unit 100 may be configured to fetch instructions for execution by the processor 30 and decode the instructions into ops for execution. More particularly, the fetch and decode unit 100 may be configured to cache instructions previously fetched from memory (through the CIF 122) in the ICache 102, and may be configured to fetch a speculative path of instructions for the processor 30. The fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "op."

The MDR unit 106 may be configured to map the ops to speculative resources (e.g. physical registers) to permit out-of-order and/or speculative execution, and may dispatch the ops to the reservation stations 110 and 116. The ops may be mapped to physical registers in the register file 114 from the architectural registers used in the corresponding instructions. That is, the register file 114 may implement a set of physical registers that may be greater in number than the architected registers specified by the instruction set architecture implemented by the processor 30. The MDR unit 106 may manage the mapping of the architected registers to physical registers. There may be separate physical registers for different operand types (e.g., integer, media, floating point, etc.) in an embodiment. In other embodiments, the physical registers may be shared over operand types. The MDR unit 106 may also be responsible for tracking the speculative execution and retiring ops or flushing misspeculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 28 or even via execution of earlier load ops. The operands may be gathered by the reservation station 116, or may be read from a register file 114 upon issue from the reservation station 116 as shown in FIG. 15.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that preallocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 46/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g. a register in the register file 114), unless the address hits a preceding operation in the STQ 120 (that is, an older store in program order) or the load is replayed. The data may also be forwarded to dependent ops that were speculatively scheduled and are in the execution units 28. The execution units 28 may bypass the forwarded data in place of the data output from the register file 114, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc.

The execution units 28 may include any types of execution units in various embodiments. For example, the execution units 28 may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector ops may be used, e.g. to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, vector ops include single instruction-multiple data (SIMD) or vector operations on an operand that represents multiple media data.

Thus, each execution unit 28 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 28 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 16:
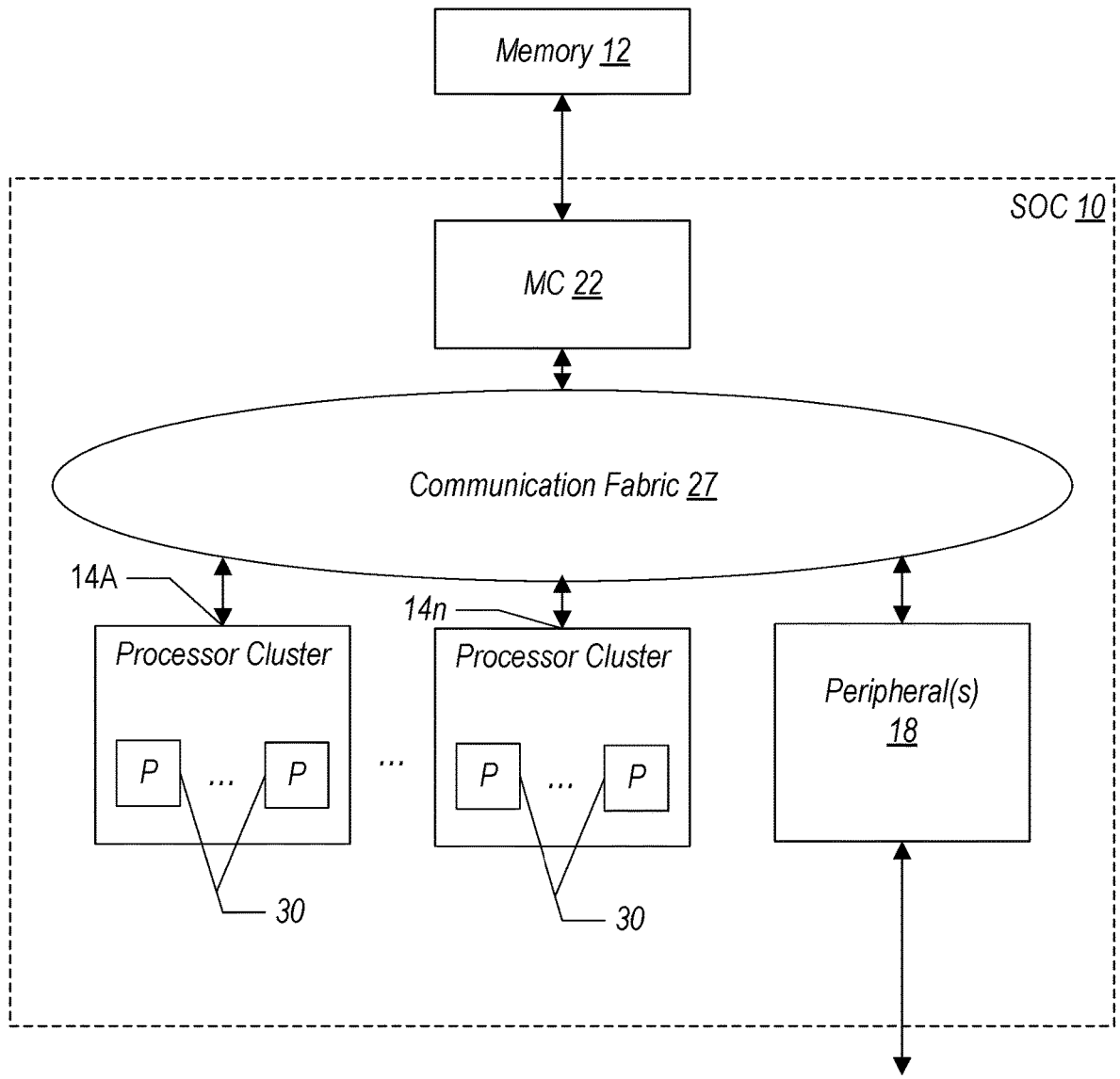
FIG. 16 is a block diagram of one embodiment of a system on a chip (SOC) that may include one or more processors shown in FIGS. 1-15.

Turning now to FIG. 16, a block diagram one embodiment of the system 10 implemented as a system on a chip (SOC) 10 is shown coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14A-14n, one or more peripheral components 18 (more briefly, "peripherals"), a memory controller 22, and a communication fabric 27. The components 14A-14n, 18, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14A-14n may include the respective plurality of processors (P) 30 (e.g., the sending and/or remote processors as described above). The processors 30 may form the central processing units (CPU(s)) of the SOC 10. In an embodiment, one or more processor clusters 14A-14n may not be used as CPUs.

As mentioned above, the processor clusters 14A-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The interconnection to external device is illustrated by the dashed arrow in FIG. 1 that extends external to the SOC 10. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packetbased, and may be hierarchical with bridges, cross bar, point-to-point, or other interconnects.

It is noted that the number of components of the SOC 10 (and the number of subcomponents for those shown in FIG. 16, such as the processors 30 in each processor cluster 14A-14n may vary from embodiment to embodiment. Additionally, the number of processors 30 in one processor cluster 14A-14n may differ from the number of processors 30 in another processor cluster 14A-14n. There may be more or fewer of each component/subcomponent than the number shown in FIG. 16.

Computer System

Figure 17:
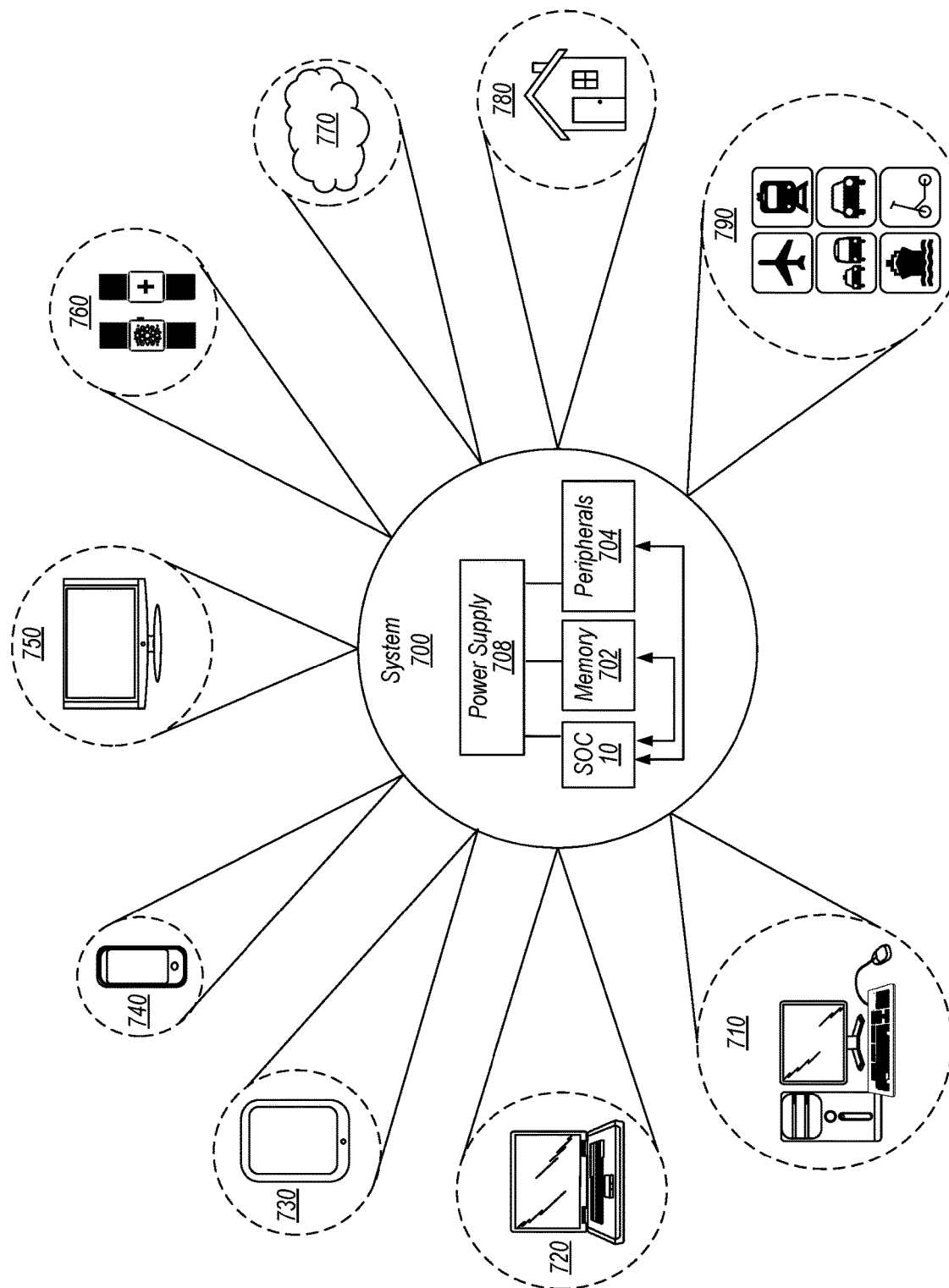
FIG. 17 is a block diagram of one embodiment of a system, including at least one instance of a system on a chip (SOC) in FIGS. 1-16, used in a variety of contexts.

Turning next to FIG. 17, a block diagram of one embodiment of a system 700 is shown. In the illustrated embodiment, the system 700 includes at least one instance of a system on a chip (SOC) 10 (as described above) coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 illustrated in FIGS. 1-10, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 17 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 17 are illustrative only and are not intended to be limiting. Other devices are possible and are contemplated.

Computer Readable Storage Medium

Figure 18:
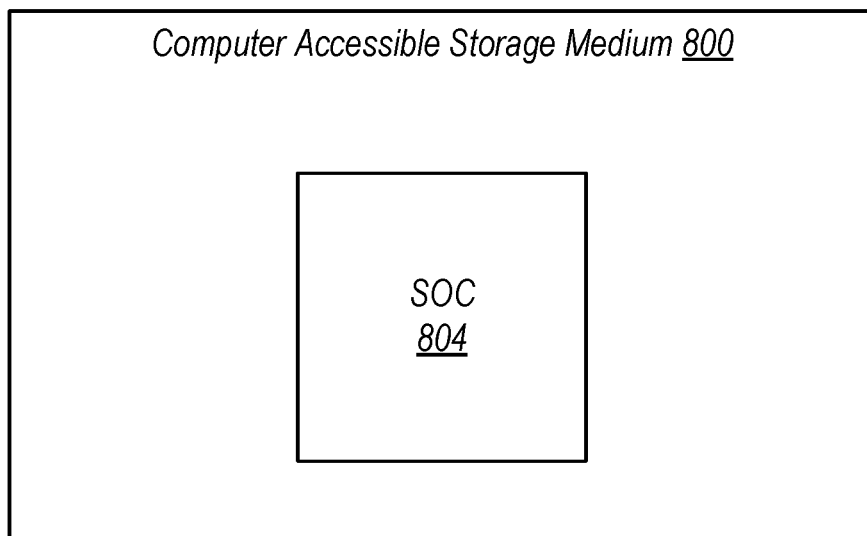
FIG. 18 is a block diagram of a computer accessible storage medium that may store a database representative of a system on a chip (SOC) in FIGS. 1-17.

Turning now to FIG. 18, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 18 may store a database 804 representative of the SOC 10 described above. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 4. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:
1. A processor, comprising:
one or more circuits configured to implement an instruction pipeline configured to execute program instructions including an instruction synchronization barrier (ISB) instruction, wherein during execution of the ISB instruction, the instruction pipeline is configured to:
determine whether one or more contexts of the processor that are required for execution of one or more instructions older than the ISB instruction are consumed for the older instruction; and
responsive to a determination that the contexts of the processor are consumed for the one or more older instructions, initiate fetching of an instruction younger than the ISB instruction before the one or more older instructions retire.

2. The processor of claim 1, wherein prior to an initiation of the fetching of the younger instruction, the instruction pipeline is configured to flush instructions younger than the ISB instruction from the instruction pipeline.

3. The processor of claim 1, wherein the instruction pipeline is configured to:
determine whether the fetched younger instruction causes loading of data before the data is updated by a first instruction of the one or more older instructions; and
responsive to a determination that the fetched younger instruction causes loading of data before the data is updated by the first instruction of the one or more older instructions, flush the fetched younger instruction from the instruction pipeline to cause the younger instruction to be re-fetched after the data is updated by the first instruction.

4. The processor of claim 3, wherein the instruction pipeline is configured to make the determination whether the fetched younger instruction causes loading of data before the data is updated by the older instructions after the older instruction retire.

5. The processor of claim 1, wherein the instruction pipeline is configured to:
determine whether an error occurs during execution of the ISB instruction which is associated with an update caused by another processor to a context of the processor; and
responsive to a determination that the error occurs, flush the fetched younger instruction from the instruction pipeline of the processor to cause the younger instruction to be re-fetched.

6. The processor of claim 5, wherein the instruction pipeline is configured to make the determination whether the error occurs after the older instructions retire.

7. The processor of claim 1, wherein prior to the execution of the ISB instruction, the instruction pipeline is configured to cause fetching of instructions to be stalled after the ISB instruction is decoded.

8. The processor of claim 1, wherein a first instruction of the one or more older instructions comprises one of: a load instruction to load data from a cache or memory to a register, a store instruction to store data from a register to a cache or memory, a write instruction to write data to a register, a read instruction to read data from a register, a translation look-ahead buffer invalidate instruction to invalidate an entry in a translation look-ahead buffer, or an instruction buffer invalidate instruction to invalidate an entry in an instruction buffer.

9. The processor of claim 1, wherein the program instructions include a data synchronization barrier (DSB) instruction, and wherein during execution of the DSB instruction, the instruction pipeline is configured to:
send an indication to another processor that the DSB instruction is pending in the instruction pipeline; and continued to fetch instructions younger than the DSB instruction before receiving an acknowledgement from the other processor in response to the DSB indication.

10. The processor of claim 9, wherein prior to fetching the younger instructions, the instruction pipeline is configured to flush instructions younger than the DSB instruction from the instruction pipeline.

11. The processor of claim 9, wherein the instruction pipeline is configured to:
   determine whether prior to receiving the acknowledgement, one of the younger instructions that are continuously fetched causes loading of data before the data is updated by the other processor; and
   responsive to a determination that prior to receiving the acknowledgement, one of the younger instructions that are continuously fetched causes loading of data before the data is updated by the other processor, flush the fetched younger instruction from the instruction pipeline to cause the younger to be re-fetched after receiving the acknowledgement.

12. The processor of claim 9, wherein the instruction pipeline is configured to retire the DSB instruction after receiving the acknowledgement from the other processor.

13. The processor of claim 9, wherein the ISB instruction is subsequent to the DSB instruction.

14. The processor of claim 9, wherein the DSB instruction is subsequent to one of: a translation look-ahead buffer invalidate instruction to invalidate an entry in a translation look-ahead buffer, or an instruction cache invalidate instruction to invalidate an instruction in an instruction cache.

15. A method, comprising:
   during execution of an instruction synchronization barrier (ISB) instruction by a processor,
      determining whether one or more contexts of the processor that are required for execution of one or more instructions older than the ISB instruction are consumed for the older instructions; and
      responsive to a determination that the contexts of the processor are consumed for the one or more older instructions, initiating fetching of an instruction younger than the ISB before the one or more older instructions retire.

16. The method of claim 15, further comprising:
   determining whether the fetched younger instruction causes loading of data before the data is updated by the older instructions; and
   responsive to determining that the fetched younger instruction causes loading of data before the data is updated by the older instructions, flushing the fetched younger instruction from an instruction pipeline of the processor to cause the younger instruction to be re-fetched after the data is updated by the older instructions.

17. The method of claim 16, wherein determining whether the fetched younger instruction causes loading of data before the data is updated by the older instructions is performed after the older instruction retire.

18. The method of claim 15, further comprising:
   determining whether an error occurs during execution of the ISB instruction which is associated with an update caused by another processor to a context of the processor; and
   responsive to determining that the error occurs, flushing the fetched younger instruction from an instruction pipeline of the processor to cause the younger instruction to be re-fetched.

19. The method of claim 18, determining whether the error occurs is performed after the older instruction retire.

20. A device, comprising:
   a processor; and
   memory storing program instructions including an instruction synchronization barrier (ISB) instruction executable by the processor,
   wherein during execution of the ISB instruction, the processor is configured to:
      determine whether one or more contexts of the processor that are required for execution of one or more instructions older than the ISB instruction are consumed for the older instruction; and
      responsive to a determination that the contexts of the processor are consumed for the one or more older instructions, initiate fetching of an instruction younger than the ISB instruction before the one or more older instructions retire.

* * * * *